US008548938B2

(12) United States Patent
Amaru et al.

(10) Patent No.: US 8,548,938 B2
(45) Date of Patent: Oct. 1, 2013

(54) BUSINESS RULES FOR CONFIGURABLE METAMODELS AND ENTERPRISE IMPACT ANALYSIS

(75) Inventors: Ruth M. Amaru, Gush Etzion (IL);
Joshua Fox, Emek Ha'ela (IL);
Benjamin Halberstadt, Jerusalem (IL);
Boris Melamed, Jerusalem (IL); Zvi Schreiber, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/421,611

(22) Filed: Mar. 15, 2012

(65) Prior Publication Data

US 2012/0215592 A1 Aug. 23, 2012

Related U.S. Application Data

(60) Division of application No. 11/219,039, filed on Sep. 1, 2005, now abandoned, which is a continuation-in-part of application No. 10/053,045, filed on Jan. 15, 2002, now abandoned, which is a continuation-in-part of application No. 09/866,101, filed on May 25, 2001, now Pat. No. 7,099,855.

(51) Int. Cl.
*G06F 17/00* (2006.01)
*G06F 7/00* (2006.01)

(52) U.S. Cl.
USPC .......................................... 707/603; 707/944

(58) Field of Classification Search
USPC ...................................................... 707/600
See application file for complete search history.

(56) References Cited

U.S. PATENT DOCUMENTS

| 5,295,242 A | 3/1994 | Mashruwala et al. |
| 5,499,371 A | 3/1996 | Henninger et al. |
| 5,627,979 A | 5/1997 | Chang et al. |
| 5,710,917 A | 1/1998 | Musa et al. |
| 5,734,887 A | 3/1998 | Kingberg et al. |
| 5,768,580 A | 6/1998 | Wical |

(Continued)

FOREIGN PATENT DOCUMENTS

| GB | 2399665 A | 9/2004 |
| JP | 2001092827 A | 4/2001 |

(Continued)

OTHER PUBLICATIONS

"Architectures for Enterprise Application Integration," IBM Corporation, Aug. 6, 1999, 11 pages.

(Continued)

*Primary Examiner* — Kimberly Wilson
(74) *Attorney, Agent, or Firm* — Yee & Associates, P.C.; Susan Murray

(57) ABSTRACT

A metadata management system for importing, integrating and federating metadata, including a configurable metamodel, a metadata repository for storing metadata whose structure reflects the metamodel, at least one external metadata source, which is able to persist metadata in accordance with the structure of a meta-schema, a mapping module for mapping the meta-schema to the metamodel, and a transformation module, operatively coupled to the metadata mapping module, for translating specific metadata from the at least one external metadata source to the metadata repository, for use in import, export or synchronization of metadata between the external metadata source and the metadata repository. A method and a computer-readable storage medium are also described.

12 Claims, 13 Drawing Sheets

(56) References Cited

U.S. PATENT DOCUMENTS

| | | |
|---|---|---|
| 5,799,309 A | 8/1998 | Srinivasan |
| 5,838,965 A | 11/1998 | Kavanagh et al. |
| 5,857,197 A | 1/1999 | Mullins |
| 5,873,093 A | 2/1999 | Williamson et al. |
| 5,878,434 A | 3/1999 | Draper et al. |
| 5,905,987 A | 5/1999 | Shutt et al. |
| 5,937,409 A | 8/1999 | Wetherbee |
| 5,950,190 A | 9/1999 | Yeager et al. |
| 5,970,490 A * | 10/1999 | Morgenstern ................... 1/1 |
| 5,995,756 A | 11/1999 | Herrmann |
| 6,003,034 A | 12/1999 | Tuli |
| 6,014,666 A | 1/2000 | Helland et al. |
| 6,035,342 A | 3/2000 | Bernstein et al. |
| 6,112,201 A | 8/2000 | Wical |
| 6,173,289 B1 | 1/2001 | Sonderegger et al. |
| 6,175,837 B1 | 1/2001 | Sharma et al. |
| 6,192,365 B1 | 2/2001 | Draper et al. |
| 6,199,059 B1 | 3/2001 | Dahan et al. |
| 6,219,654 B1 | 4/2001 | Ruffin |
| 6,233,586 B1 | 5/2001 | Chang et al. |
| 6,289,338 B1 | 9/2001 | Stoffel et al. |
| 6,292,804 B1 | 9/2001 | Ardoin et al. |
| 6,301,584 B1 | 10/2001 | Ranger |
| 6,311,194 B1 | 10/2001 | Sheth et al. |
| 6,317,783 B1 | 11/2001 | Freishtat et al. |
| 6,327,593 B1 | 12/2001 | Goiffon |
| 6,343,265 B1 | 1/2002 | Glebov et al. |
| 6,347,307 B1 | 2/2002 | Sandhu et al. |
| 6,374,252 B1 | 4/2002 | Althoff et al. |
| 6,397,232 B1 | 5/2002 | Cheng-Hung et al. |
| 6,424,973 B1 | 7/2002 | Baclawski |
| 6,424,974 B1 | 7/2002 | Cotner et al. |
| 6,446,110 B1 | 9/2002 | Lection et al. |
| 6,497,943 B1 | 12/2002 | Jimarez et al. |
| 6,498,795 B1 | 12/2002 | Zhang et al. |
| 6,513,059 B1 | 1/2003 | Gupta et al. |
| 6,523,036 B1 | 2/2003 | Hickman et al. |
| 6,526,416 B1 | 2/2003 | Long |
| 6,532,471 B1 | 3/2003 | Ku et al. |
| 6,560,595 B1 | 5/2003 | Sanders et al. |
| 6,569,207 B1 | 5/2003 | Sundaresan |
| 6,578,046 B2 | 6/2003 | Chang et al. |
| 6,591,272 B1 | 7/2003 | Williams |
| 6,604,100 B1 | 8/2003 | Fernandez et al. |
| 6,633,869 B1 | 10/2003 | Duparcmeur et al. |
| 6,633,878 B1 | 10/2003 | Underwood |
| 6,640,231 B1 | 10/2003 | Andersen et al. |
| 6,643,633 B2 | 11/2003 | Chau et al. |
| 6,651,244 B1 | 11/2003 | Smith et al. |
| 6,654,734 B1 | 11/2003 | Mani et al. |
| 6,687,873 B1 | 2/2004 | Ballantyne et al. |
| 6,704,744 B1 | 3/2004 | Williamson et al. |
| 6,708,161 B2 | 3/2004 | Tenorio et al. |
| 6,708,186 B1 | 3/2004 | Claborn et al. |
| 6,710,753 B2 | 3/2004 | Gillespie et al. |
| 6,711,579 B2 | 3/2004 | Balakrishnan |
| 6,711,585 B1 | 3/2004 | Copperman et al. |
| 6,718,320 B1 | 4/2004 | Subramanian et al. |
| 6,725,231 B2 | 4/2004 | Hu et al. |
| 6,728,692 B1 | 4/2004 | Martinka et al. |
| 6,732,109 B2 | 5/2004 | Lindberg et al. |
| 6,732,175 B1 | 5/2004 | Abjanic |
| 6,742,054 B1 | 5/2004 | Upton, IV |
| 6,748,583 B2 | 6/2004 | Aizenbud-Reshef et al. |
| 6,754,670 B1 | 6/2004 | Lindsay et al. |
| 6,760,734 B1 * | 7/2004 | Stephens ................... 1/1 |
| 6,772,031 B1 | 8/2004 | Strand |
| 6,778,990 B2 | 8/2004 | Garcia et al. |
| 6,792,580 B2 | 9/2004 | Kawakatsu |
| 6,847,974 B2 | 1/2005 | Wachtel |
| 6,871,204 B2 | 3/2005 | Krishnaprasad et al. |
| 6,874,146 B1 * | 3/2005 | Iyengar ................... 719/313 |
| 6,892,238 B2 | 5/2005 | Lee et al. |
| 6,898,618 B1 | 5/2005 | Slaughter et al. |
| 6,947,943 B2 | 9/2005 | DeAnna et al. |
| 6,957,214 B2 | 10/2005 | Silberberg et al. |
| 6,978,257 B1 | 12/2005 | Halbout et al. |
| 6,985,905 B2 | 1/2006 | Prompt et al. |
| 6,996,566 B1 | 2/2006 | George et al. |
| 6,999,956 B2 | 2/2006 | Mullins |
| 7,007,029 B1 | 2/2006 | Chen |
| 7,024,425 B2 | 4/2006 | Krishnaprasad et al. |
| 7,027,974 B1 | 4/2006 | Busch et al. |
| 7,093,200 B2 | 8/2006 | Schreiber et al. |
| 7,096,224 B2 | 8/2006 | Murthy et al. |
| 7,099,885 B2 | 8/2006 | Hellman et al. |
| 7,111,297 B1 | 9/2006 | Sankaranarayan et al. |
| 7,146,399 B2 | 12/2006 | Fox et al. |
| 7,200,563 B1 | 4/2007 | Hammitt et al. |
| 7,254,589 B2 | 8/2007 | Goodwin et al. |
| 7,278,164 B2 | 10/2007 | Raiz et al. |
| 7,302,410 B1 | 11/2007 | Venkatraman et al. |
| 7,315,849 B2 | 1/2008 | Bakalash et al. |
| 7,472,137 B2 | 12/2008 | Edelstein et al. |
| 7,475,084 B2 | 1/2009 | Edelstein et al. |
| 7,533,107 B2 | 5/2009 | Gupta et al. |
| 7,533,124 B2 | 5/2009 | Hellman et al. |
| 7,673,282 B2 | 3/2010 | Amaru et al. |
| 7,739,223 B2 | 6/2010 | Vaschillo et al. |
| 7,877,421 B2 | 1/2011 | Berger et al. |
| 7,921,098 B2 | 4/2011 | Edelstein et al. |
| 7,930,293 B2 * | 4/2011 | Fox et al. ................... 707/713 |
| 7,962,503 B2 | 6/2011 | Edelstein et al. |
| 8,060,531 B2 | 11/2011 | Edelstein et al. |
| 2002/0059183 A1 | 5/2002 | Chen |
| 2002/0059187 A1 | 5/2002 | Delo et al. |
| 2002/0059425 A1 | 5/2002 | Belfiore et al. |
| 2002/0059566 A1 | 5/2002 | Delcambre et al. |
| 2002/0073236 A1 | 6/2002 | Helgeson et al. |
| 2002/0087571 A1 | 7/2002 | Stapel et al. |
| 2002/0087620 A1 | 7/2002 | Rouse et al. |
| 2002/0099738 A1 | 7/2002 | Grant |
| 2002/0107844 A1 | 8/2002 | Cha et al. |
| 2002/0120685 A1 | 8/2002 | Srivastava et al. |
| 2002/0133484 A1 | 9/2002 | Chau et al. |
| 2002/0133569 A1 | 9/2002 | Huang et al. |
| 2002/0143819 A1 | 10/2002 | Han et al. |
| 2002/0169842 A1 | 11/2002 | Christensen et al. |
| 2002/0194154 A1 | 12/2002 | Levy et al. |
| 2003/0018616 A1 | 1/2003 | Wilbanks et al. |
| 2003/0036917 A1 | 2/2003 | Hite et al. |
| 2003/0050932 A1 | 3/2003 | Pace et al. |
| 2003/0093471 A1 | 5/2003 | Upton |
| 2003/0101170 A1 | 5/2003 | Edelstein et al. |
| 2003/0110055 A1 | 6/2003 | Chau |
| 2003/0120665 A1 | 6/2003 | Fox et al. |
| 2003/0126136 A1 | 7/2003 | Omoigui |
| 2003/0149934 A1 | 8/2003 | Worden |
| 2003/0163450 A1 | 8/2003 | Borenstein et al. |
| 2003/0163597 A1 | 8/2003 | Hellman et al. |
| 2003/0167445 A1 | 9/2003 | Su et al. |
| 2003/0172368 A1 | 9/2003 | Alumbaugh et al. |
| 2003/0177481 A1 | 9/2003 | Amaru et al. |
| 2003/0179228 A1 | 9/2003 | Schreiber et al. |
| 2003/0191608 A1 | 10/2003 | Anderson et al. |
| 2003/0233224 A1 | 12/2003 | Marchisio et al. |
| 2004/0010491 A1 | 1/2004 | Riedinger |
| 2004/0054690 A1 | 3/2004 | Hillerbrand et al. |
| 2004/0093344 A1 | 5/2004 | Berger et al. |
| 2004/0093559 A1 | 5/2004 | Amaru et al. |
| 2004/0117346 A1 | 6/2004 | Stoffel et al. |
| 2004/0216030 A1 | 10/2004 | Hellman et al. |
| 2004/0220893 A1 | 11/2004 | Spivack et al. |
| 2005/0038629 A1 | 2/2005 | Amaru et al. |
| 2005/0060371 A1 | 3/2005 | Cohen et al. |
| 2005/0080656 A1 | 4/2005 | Crow et al. |
| 2005/0138173 A1 | 6/2005 | Ha et al. |
| 2005/0149484 A1 | 7/2005 | Fox et al. |
| 2005/0197926 A1 | 9/2005 | Chinnappan et al. |
| 2005/0216500 A1 | 9/2005 | Edelstein et al. |
| 2005/0234889 A1 | 10/2005 | Fox et al. |
| 2005/0240606 A1 | 10/2005 | Edelstein et al. |
| 2005/0251533 A1 | 11/2005 | Harken et al. |
| 2005/0267871 A1 | 12/2005 | Marchisio et al. |

| | | | |
|---|---|---|---|
| 2006/0064666 | A1 | 3/2006 | Amaru et al. |
| 2006/0156253 | A1 | 7/2006 | Schreiber et al. |
| 2006/0167927 | A1 | 7/2006 | Edelstein et al. |
| 2006/0167946 | A1 | 7/2006 | Hellman et al. |
| 2006/0218177 | A1 | 9/2006 | Chang et al. |
| 2007/0038500 | A1 | 2/2007 | Hammitt et al. |
| 2008/0140549 | A1 | 6/2008 | Eder |
| 2008/0313232 | A1 | 12/2008 | Edelstein et al. |
| 2009/0077051 | A1 | 3/2009 | Edelstein et al. |

FOREIGN PATENT DOCUMENTS

| | | | |
|---|---|---|---|
| WO | 0115042 | A2 | 3/2001 |
| WO | 0205137 | A2 | 1/2002 |
| WO | 0231680 | A1 | 4/2002 |
| WO | 02080028 | A1 | 10/2002 |
| WO | 02099725 | A1 | 12/2002 |
| WO | 2005010653 | A2 | 2/2005 |
| WO | 2006020343 | A1 | 2/2006 |
| WO | 2006071928 | A2 | 7/2006 |

OTHER PUBLICATIONS

"LAN Emulation Over ATM, Version 2—LUNI Specification," The ATM Forum Technical Committee, AF-LANE-0084.000, Jul. 1997, 7 pages.

"Oracle 9i SQL Reference, Release 1 (9.0.1)," Oracle Corporation, A90125-01, Jun. 2001, 42 pages.

"SQL (Structured Query Language)", Wikipedia, dated Jun. 25, 2009, 12 pages. Retrieved Jun. 6, 2009 from http://en.wikipedia.org/wiki/SQL.

"The DARPA Agent Markup Language Homepage," dated Jun. 14, 2001, 2 pages. Retrieved Jun. 21, 2001 from http://www.daml.org.

"About DAML," dated May 4, 2001, 2 pages. Retrieved Jun. 21, 2001 from http://www.daml.org/about.html.

"DAML+Oil (Mar. 2001)," dated Mar. 27, 2001, 9 pages. Retrieved Jun. 21, 2001 from http://www.daml.org/2001/03/daml+oil-index.html.

RDF Code Revised Language Specification, dated Jun. 6, 2001, 9 pages. Retrieved from http://www.daml.org/2001/03/daml+oil.daml.

"Welcome to Oil," 2 pages. Retrieved Jun. 21, 2001 from http://www.ontoknowledge.org/oil/.

"Welcome to the ProtégéProject," Protégé-2000, copyright 2001, 1 page. Retrieved Jun. 21, 2001 from http://smi.web.stanford.edu/projects/protege/.

"What is Protégé-2000?" Protégé-2000, copyright 2001, 1 page. Retrieved Jun. 21, 2001 from http://smi.web.stanford.edu/projects/protege/whatis/html.

"The Classes Tab," Protégé-2000, copyright 2001, 1 page. Retrieved Jun. 21, 2001 from http://smi-web.stanford.edu/projects/protege/classes.html.

"The Forms Tab," Protégé-2000, copyright 2001, 1 page. Retrieved Jun. 21, 2001 from http://smi-web.stanford.edu/projects/protege/forms.html.

"The Instances Tab," Protégé-2000, copyright 2001, 1 page. Retrieved Jun. 21, 2001 from http://smi-web.stanford.edu/projects/protege/instances.html.

Office Action, dated Jul. 6, 2005, regarding U.S. Appl. No. 09/866,101, 18 pages.

Notice of Allowance, dated Jan. 13, 2006, regarding U.S. Appl. No. 09/866,101, 23 pages.

Office Action, dated Mar. 15, 2004, regarding U.S. Appl. No. 09/904,457, 17 pages.

Final Office Action, dated Nov. 18, 2004, regarding U.S. Appl. No. 09/904,457, 15 pages.

Office Action, dated Apr. 4, 2005, regarding U.S. Appl. No. 09/904,457, 15 pages.

Notice of Allowance, dated Nov. 3, 2005, regarding U.S. Appl. No. 09/904,457, 6 pages.

Office Action, dated Sep. 28, 2005, regarding U.S. Appl. No. 10/053,045, 29 pages.

Final Office Action, dated May 3, 2006, regarding U.S. Appl. No. 10/053,045, 28 pages.

Office Action, dated Sep. 1, 2006, regarding U.S. Appl. No. 10/053,045, 23 pages.

Final Office Action, dated Feb. 12, 2007, regarding U.S. Appl. No. 10/053,045, 34 pages.

Office Action, dated Feb. 18, 2005, regarding U.S. Appl. No. 10/104,785, 10 pages.

Office Action, dated Jul. 21, 2005, regarding U.S. Appl. No. 10/104,785, 10 pages.

Final Office Action, dated Dec. 15, 2005, regarding U.S. Appl. No. 10/104,785, 10 pages.

Notice of Allowance, dated Apr. 24, 2006, regarding U.S. Appl. No. 10/104,785, 6 pages.

Office Action, dated Apr. 5, 2005, regarding U.S. Appl. No. 10/159,516, 11 pages.

Final Office Action, dated Sep. 7, 2005, regarding U.S. Appl. No. 10/159,516, 15 pages.

Office Action, dated Jun. 7, 2006, regarding U.S. Appl. No. 10/159,516, 14 pages.

Final Office Action, dated Nov. 9, 2006, regarding U.S. Appl. No. 10/159,516, 14 pages.

Office Action, dated Feb. 4, 2009, regarding U.S. Appl. No. 10/302,370, 16 pages.

Notice of Allowance, dated Jun. 30, 2009, regarding U.S. Appl. No. 10/302,370, 4 pages.

Office Action, dated Mar. 8, 2006, regarding U.S. Appl. No. 10/340,068, 24 pages.

Final Office Action, dated Oct. 23, 2006, regarding U.S. Appl. No. 10/340,068, 23 pages.

Office Action, dated Apr. 7, 2006, regarding U.S. Appl. No. 10/637,339, 41 pages.

Office Action, dated Sep. 22, 2006, regarding U.S. Appl. No. 10/637,339, 42 pages.

Final Office Action, dated Mar. 27, 2007, regarding U.S. Appl. No. 10/637,339, 56 pages.

Notice of Allowance, dated Jun. 2, 2010, regarding U.S. Appl. No. 10/637,339, 4 pages.

Notice of Allowance, dated Sep. 17, 2010, regarding U.S. Appl. No. 10/637,339, 16 pages.

Office Action, dated Mar. 6, 2009, regarding U.S. Appl. No. 10/637,171, 17 pages.

Final Office Action, dated Nov. 23, 2009, regarding U.S. Appl. No. 10/637,171, 32 pages.

Alles, "ATM Internetworking," Cisco Systems, Inc., May 1995, 26 pages.

Bechhofer et al., "An Informal Description of Standard OIL and Instance OIL," White Paper dated Nov. 28, 2000, 15 pages.

Bechhofer et al., "Terminologies and Terminology Servers for Information Environments," Proceedings of the Eighth IEEE International Workshop on Software Technology and Engineering Practice, Jul. 1997, 14 pages.

Benmohamed et al., "A Control-Theoretic ABR Explicit Rate Algorithm for ATM Switches with Per-VC Queueing," Proceedings of the Seventeenth Annual Joint Conference of the IEEE Computer and Communications Societies, Mar.-Apr. 1998, pp. 183-191.

Biron et al., "XML Schema Part 2: Datatypes," W3C Recommendation dated May 2, 2001, 5 pages. Retrieved Nov. 29, 2001 from http://www.w3.org/TR/xmlschema-2/.

Bray et al., "Extensible Markup Language (XML) 1.0 (Second Edition)," dated Oct. 6, 2000, 6 pages. Retrieved Nov. 29, 2001 from http://www.w3.org/TR/2000/REC-xml-20001006.

Chiussi et al., "Virtual Queueing Techniques for ABR Service: Improving ABR/VBR Interaction," Proceedings of the Sixteenth Annual Joint Conference of the IEEE Computer and Communications Societies, Apr. 1998, pp. 406-418.

Clark et al., "XML Path Language (XPath) Version 1.0," W3C Recommendation dated Nov. 16, 1999, 4 pages. Retrieved Nov. 29, 2001 from http://www.w3.org/TR/1/xpath.

Clark, "XSL Transformations (XSLT), Version 1.0," W3C Recommendation dated Nov. 16, 1999, 5 pages. Retrieved Nov. 29, 2001 from http://www.w3.org/TR/xslt.

Czejdo et al., "Automatic Generation of Ontology Based Annotations in XML and their use in Retrieval Systems," Proceedings of the First International Conference on Web Information Systems Engineering, 2000, pp. 296-300.

Decker et al., "Ontobroker: Ontology Based Access to Distributed and Semi-Structured Information," Proceedings of the Eighth Working Conference on Database Semantics—Semantic Issues in Multimedia Systems (DS-8), 1998, 20 pages.

Deloule et al., "Ontologies & Knowledge Representation," Proceedings of the 1995 IEEE International Conference on Systems, Man and Cybernetics—Intelligent Systems for the 21st Century, vol. 5 Oct. 1995, pp. 3857-3862.

Dimitrov, "XML Standards for Ontology Exchange," Proceedings of Ontolex: Ontologies and Lexical Knowledge Bases, Sep. 2000, 68 pages.

European Search Report, dated Dec. 20, 2005, regarding Application No. EP02006919 (EP1327941), 3 pages.

Fallside, "XML Schema Part 0: Primer," W3C Recommendation dated May 2, 2001, 4 pages. Retrieved Nov. 29, 2001 from http://www.w3.org/TR/xmlschema-0/.

Farquhar et al., "The Ontolingua Server: A Tool for Collaborative Ontology Construction," International Journal of Human-Computer Studies, vol. 46, No. 6, Jun. 1007, 19 pages.

Fernandes, "SNOBASE," Pontifica Universidade Catolica do Rio de Janeiro, Presentation dated May 2004, 18 pages.

Fikes et al., "Distributed Repositories of Highly Expressive Reusable Ontologies," IEEE Intelligent Systems, vol. 14, No. 2, Mar.-Apr. 1999, 14 pages.

Genesereth, Knowledge Interchange Format draft proposed American National Standard (dpANS), NCITS. T2/98-004, 31 pages. Retrieved Jun. 21, 2001 from http://logic.stanford.edu/kif/dpans/html.

Ghani et al., "Hierarchical Scheduling for Integrated ABR/VBR Services in ATM Networks," Proceedings of the IEEE Global Telecommunications Conference (GLOBECOM '97), Nov. 1997, pp. 779-784.

Green et al., "Applying Ontologies to Business and Systems Modeling Techniques and Perspectives: Lessons Learned," Journal of Database Management, vol. 15, No. 2, Apr.-Jun. 2004, pp. 105-117.

Greenhill et al., "Noetica: A Tool for Semantic Data Modeling," Information Processing & Management, Vo. 34, No. 6, Nov. 1998, pp. 739-760.

Horrocks, "A Denotational Semantics for Standard OIL and Instance OIL," Department of Computer Science, University of Manchester, Nov. 2000, 9 pages.

Hu et al., "Ontology-based Medical Image Annotation with Description Logics," Proceedings of the 15th IEEE International Conference on Tools with Artificial Intelligence (ICTA '03), Nov. 2003, 6 pages.

Irani, "Enabling Web Services with BEA WebLogic," Web Services Architect, Sep. 26, 2001, 5 pages. Retrieved Oct. 19, 2006 from http://www.webservicesarchitect.com/content/articles/irani05print/asp.

Jin et al., "A Methodology for Acquisition of Software Component Attribute Ontology," Proceedings of the Fourth International Conference on Computer and Information Technology (CIT '04), Sep. 2004, 7 pages.

Kitajima et al., "Integrating Information and Knowledge with Software Agents," Fujitsu Scientific and Technical Journal, vol. 36, No. 2, Dec. 2000, pp. 162-174.

Klein et al., "The Relation between Ontologies and Schema-Languages: Translating OIL-specifications in XML-Schema," Proceedings of the 14th European Conference on Artificial Intelligence Workshop on Applications of Ontologies and Problem-solving Methods, 2000, 12 pages.

Lassila "Introduction to RDF Metadata," W3 Consortium Note dated Nov. 13, 1997, 5 pages. Retrieved from http://www.w3.org/TR/NOTE-rdf-simple-intro.

Lassila et al., "Resource Description Framework (RDF) Model and Syntax Specification," W3 Consortium Recommendation dated Feb. 22, 1999, 48 pages. Retrieved from http://www.w3.org/TR/REC-rdf-syntax/.

Li et al., "Ontology-Based Intelligent Information Retrieval System," 2004 Canadian Conference on Electrical and Computer Engineering, May 2004, pp. 373-376.

Lin, "Constant-Time Dynamic ATM Bandwidth Scheduling for Guaranteed and Best Effort Services with Overbooking," Proceedings of the Sixteenth Annual Joint Conference of the IEEE Computer and Communications Societies, Apr. 1997, pp. 398-405.

Lublinsky, "Achieving the Ultimate EAI Implementation," eAI Journal, Feb. 2001, pp. 26-31.

McGuinness et al., "DAML+OIL: An Ontology Language for the Semantic Web," IEEE Intelligent Systems, Sep./Oct. 2002, pp. 72-80.

Mena et al., "Observer: An Approach for Query Processing in Global Information Systems based on Interoperation across Pre-Existing Ontologies," Proceedings of the First IFCIS International Conference on Cooperative Information Systems, Jun. 1996, 12 pages.

Passmore et al., "The Virtual LAN Technology Report," Decisys, Inc., 1996, 22 pages.

Payton et al., "The Opportunity for Formal Models of Integration," Proceedings of the ISCA 2nd International Conference on Information Reuse and Integration, Nov. 2000, 15 pages.

Rosemann et al., "Developing a meta model for the Bunge-Wand-Weber ontological constructs," Information Systems, Vo. 27, 2002, pp. 75-91.

Ruiz et al., "A proposal of a Software Measurement Ontology," Department of Computer Science, University of Castilla-La Mancha, Dec. 2008, 15 pages.

Sowa, "Sample Ontology," In: Knowledge Representation: Logical, Philosophical, and Computational Foundations, Sowa (Ed.), Brooks/Cole, Pacific Grove, CA, 2000, 33 pages.

Swick et al., "Semantic Web Activity: Resource Description Framework (RDF)," dated Jun. 8, 2001, 7 pages. Retrieved Jun. 21, 2001 from http://www.w3.org/RDF/.

Thompson et al., "XML Schema Part 1: Structures," W3C Recommendation dated May 2, 2001, 6 pages. Retrieved Nov. 29, 2001 from http://www.w3.org/TR/xmlschema-1/.

Van Wegen et al., "Measuring the economic value of information systems," Journal of Information Technology, vol. 11, 1996, pp. 247-260.

Wadler, "A Formal Semantics of Patterns in XSLT," Markup Technologies, Mar. 2000, 15 pages.

Wang et al., "Ontology-based Web Knowledge Management," Proceedings of the 2003 Joint Conference of the Fourth International Conference on Information, Communications, and Signal Processing and Fourth Pacific Rim Conference on Multimedia, Dec. 2003, 5 pages.

Weiner, "Loading Converted Data Into the New SIS," VCC Utility Announcement dated Feb. 28, 2001, 6 pages. Retrieved from http://www.helpnet.ut.vccs.edu/ASC/Psoft/Advisories/LoadingConvertedLegacyData7.doc.

Yagoub et al., "Caching Strategies for Data-Intensive Web Sites," Proceedings of the 26th International Conference on Very Large Databases (VLDB '00), Sep. 2000, pp. 188-199.

Office Action, dated Dec. 17, 2008, regarding U.S. Appl. No. 10/821,464, 25 pages.

Final Office Action, dated Jul. 2, 2009, regarding U.S. Appl. No. 10/821,464, 27 pages.

Office Action, dated Jun. 5, 2007, regarding U.S. Appl. No. 11/026,358, 16 pages.

Final Office Action, dated Dec. 18, 2007, regarding U.S. Appl. No. 11/026,358, 14 pages.

Notice of Allowance, dated Jul. 19, 2011, regarding U.S. Appl. No. 11/026,358, 8 pages.

Office Action, dated Jul. 8, 2009, regarding U.S. Appl. No. 11/029,966, 18 pages.

Final Office Action, dated Feb. 19, 2010, regarding U.S. Appl. No. 11/029,966, 16 pages.

Office Action, dated Jun. 21, 2010, regarding U.S. Appl. No. 11/029,966, 17 pages.

Notice of Allowance, dated Dec. 8, 2010, regarding U.S. Appl. No. 11/029,966, 33 pages.

Office Action, dated Oct. 5, 2010, regarding U.S. Appl. No. 11/219,039, 32 pages.

Office Action, dated Mar. 17, 2011, regarding U.S. Appl. No. 11/219,039, 16 pages.
Final Office Action, dated Nov. 16, 2011, regarding U.S. Appl. No. 11/219,039, 18 pages.
Office Action, dated Aug. 15, 2007, regarding U.S. Appl. No. 11/134,725, 19 pages.
Final Office Action, dated Jan. 24, 2008, regarding U.S. Appl. No. 11/134,725, 15 pages.
Notice of Allowance, dated Jul. 22, 2008, regarding U.S. Appl. No. 11/134,725, 11 pages.
Notice of Allowance, dated Apr. 11, 2011, regarding U.S. Appl. No. 12/253,798, 21 pages.
Notice of Allowance, dated Jul. 20, 2011, regarding U.S. Appl. No. 12/253,798, 8 pages.
Office Action, dated Aug. 9, 2007, regarding U.S. Appl. No. 11/165,650, 12 pages.
Final Office Action, dated Feb. 4, 2008, regarding U.S. Appl. No. 11/165,650, 8 pages.
Office Action, dated Apr. 16, 2010, regarding U.S. Appl. No. 11/165,650, 6 pages.
Notice of Allowance, dated Nov. 23, 2010, regarding U.S. Appl. No. 11/165,650, 21 pages.
Office Action, dated Nov. 26, 2007, regarding U.S. Appl. No. 11/182,455, 9 pages.
Final Office Action, dated Apr. 29, 2008, regarding U.S. Appl. No. 11/182,455, 8 pages.
Notice of Allowance, dated Aug. 13, 2008, regarding U.S. Appl. No. 11/182,455, 4 pages.
Office Action, dated Sep. 9, 2010, regarding U.S. Appl. No. 12/141,637, 21 pages.
Notice of Allowance, dated Feb. 7, 2011, regarding U.S. Appl. No. 12/141,637, 4 pages.
Office Action, dated Jul. 3, 2008, regarding U.S. Appl. No. 11/373,340, 30 pages.
Notice of Allowance, dated Jan. 8, 2009, regarding U.S. Appl. No. 11/373,340, 10 pages.
Office Action, dated Oct. 30, 2008, regarding U.S. Appl. No. 11/344,545, 9 pages.
Final Office Action, dated May 1, 2009, regarding U.S. Appl. No. 11/344,545, 11 pages.
Notice of Allowance, dated Nov. 27, 2012, regarding U.S. Appl. No. 11/026,358, 48 pages.

* cited by examiner

BUSINESS RULES FOR CONFIGURABLE METAMODELS AND ENTERPRISE IMPACT ANALYSIS

CROSS REFERENCES TO RELATED APPLICATIONS

This application is a divisional of U.S. patent application Ser. No. 11/219,039, filed Sep. 1, 2005, status pending; which is a continuation-in-part of assignee's application U.S. patent application Ser. No. 10/053,045 filed on Jan. 15, 2002, status abandoned; which is a continuation-in-part of assignee's U.S. patent application Ser. No. 09/866,101 filed May 25, 2001, now U.S. Pat. No. 7,099,885 issued Aug. 29, 2006.

FIELD OF THE INVENTION

The present invention relates to management of enterprise metadata.

BACKGROUND OF THE INVENTION

Large enterprises rely on vast amounts and diverse types of data for their operation—personnel data, financial data, accounting data, inventory data, capital equipment data, document management data, and more. Today, data is generally stored according to data structures referred to as a data schemas, such as XML and relational database schemas, these being a form of metadata. The term "metadata" is used to denote data about the structure of the raw data itself, and about the structures of other Information Technology (IT) systems such as applications, processes, middleware and hardware configurations. The raw data, which includes actual data about specific personnel, for example, or specific pieces of inventory, is referred to as "instance data."Thus, for a data store having the structure of a relational database, the metadata describes the tables and their columns to be populated with data, and the raw data, referred to as instance data, is the actual data stored within the tables and columns. Similarly, for a data store of XML documents, the metadata describes the XML complexTypes and their XML elements, and the instance data is the actual data stored within the XML documents. Each data store is referred to generically as a "data asset."

Types of metadata include inter alia data schemas such as relational and XML schemas, source code, architecture models such as information models and process models, operational metadata regarding usage of applications and up-time, hardware inventories and configurations, service level agreements, and IT budgets.

It is common for large enterprises to have thousands of different data assets, each with a unique schema; i.e., thousands of different metadata descriptions, within their IT. For example, financial data may be spread out over several different relational databases, personnel data may be spread out over several different XML document stores, and inventory data may be spread out according to several different Cobol Copybook definitions.

In order to describe all of the different types of enterprise IT assets, including inter alia data assets and applications, a metamodel is used to model the entire repertoire of IT asset types. Such asset types include inter alia relational database schemas, XML schemas, COBOL Copybook definitions, Java applications, Engage Transform and Load (ETL) middleware and the structures associated therewith. A "metamodel" is a model for metadata, and describes the types of assets within the enterprise IT, and their inter-dependencies. Actual metadata itself instantiates the metamodel.

The three levels of data—instance data, metadata and metamodel, form a data hierarchy, wherein the structure of each level of data is described by the level above it. The three data levels within the data hierarchy are denoted by M0 (instance data), M1 (metadata) and M2 (metamodel). More generally, M0 includes instance data, messages and specific interactions; M1 defines actual IT structures, such as specific schemas, interfaces and inter-dependencies; and M2 describes types of structures and cross-references of IT.

In order to enable efficient use of a rich and configurable metamodel, a system is needed that supports (i) metamodel editing; (ii) classes, properties, inheritance and multiple inheritance within a metamodel; and (iii) industry standards such as Meta-Object Facility (MOF™) for structure of the metamodel, XML Interchange (XMI™) for import and export of metadata, and standard metamodels such as the Common Warehouse Metamodel (CWM™) and the DMTF Common Information Model (CIM™). MOF™, XMI and CWM™ are standards developed by the Object Modeling Group (OMG®); and CIM is a standard developed by Distributed Management Task Force, Inc. (DMTF™).

While the prior art includes flexible metamodels such as MOF-compliant metamodels, which flexibly define the structure of metadata, metamodels have not been used to describe specific rules which metadata must obey. Therefore, metamodels have hitherto had limited use in the detailed governance of IT.

Furthermore, although there are standard languages such as MOF for specifying metamodels, in reality sources of metadata currently have their own metamodels, making it difficult to accumulate metadata from different sources into one overall metadata model of enterprise IT.

SUMMARY OF THE DESCRIPTION

The present invention concerns a method and system for metadata management. The present invention supports (i) a rich and configurable metamodel with run-time metamodel editing; (ii) multiple inheritance and the addition of business rules within a metamodel; (iii) industry standards such as MOF™, XMI™, CWM™ and CIM™. The metamodel of the present invention supports an endless number of types of metadata, including inter alia metadata for data assets, business applications, organization charts, process models, hardware configurations and network topographies; and (iv) mapping between incompatible metamodels to enable import, export, synchronization and federation of metadata.

There is thus provided in accordance with a preferred embodiment of the present invention a metadata management system for importing, integrating and federating metadata, including a configurable metamodel for modeling metadata that describes enterprise IT assets, a metadata repository for storing metadata whose structure reflects the metamodel, at least one external metadata source, which is able to persist metadata in accordance with the structure of a meta-schema, a mapping module for mapping the meta-schema to the metamodel, and a transformation module, operatively coupled to the metadata mapping module, for translating specific metadata from the external metadata source to the metadata repository, for use in import, export or synchronization of metadata between the at least one external metadata source and the metadata repository.

There is further provided in accordance with a preferred embodiment of the present invention a metadata management system for validating metadata, including a configurable metamodel for modeling metadata that describes enterprise IT assets, business rules on the metamodel, and a metadata validation module operating on said configurable metamodel for validating specific metadata against the metamodel business rules.

There is yet further provided in accordance with a preferred embodiment of the present invention a metadata management system for generating metadata including a configurable metamodel for modeling metadata that describes enterprise IT assets, business rules on the metamodel, and a metadata generation module operating on said configurable metamodel for guiding the generation of specific metadata using the metamodel business rules.

There is moreover provided in accordance with a preferred embodiment of the present invention a metadata management system for managing an IT organization, including a configurable metamodel for modeling metadata that describes enterprise IT assets, business rules on the metamodel, and a validation module operating on said configurable metamodel for validating rules for IT governance against the metamodel business rules.

There is additionally provided in accordance with a preferred embodiment of the present invention a method for importing, integrating and federating metadata, including providing (i) a configurable metamodel for modeling metadata that describes enterprise IT assets, (ii) a metadata repository for storing metadata whose structure reflects the metamodel, and (iii) at least one external metadata source, which is able to persist metadata in accordance with the structure of a meta-schema, mapping the meta-schema to the metamodel, and translating specific metadata from the at least one external metadata source to the metadata repository for use in import, export or synchronization of metadata between the external metadata source and the metadata repository.

There is further provided in accordance with a preferred embodiment of the present invention a method for validating metadata, including providing (i) a configurable metamodel for modeling metadata that describes enterprise IT assets, and (ii) business rules on the metamodel, and validating specific metadata against the metamodel business rules.

There is yet further provided in accordance with a preferred embodiment of the present invention a method for generating metadata including providing (i) a configurable metamodel for modeling metadata that describes enterprise IT assets, and (ii) business rules on the metamodel, and guiding the generation of specific metadata using the metamodel business rules.

There is moreover provided in accordance with a preferred embodiment of the present invention a method for managing an IT organization, including providing (i) a configurable metamodel for modeling metadata that describes enterprise IT assets, and (ii) business rules on the metamodel, and validating rules for IT governance against the metamodel business rules.

There is additionally provided in accordance with a preferred embodiment of the present invention a computer-readable storage medium storing program code for causing a computer to perform the steps of providing (i) a configurable metamodel for modeling metadata that describes enterprise IT assets, (ii) a metadata repository for storing metadata whose structure reflects the metamodel, and (iii) at least one external metadata source, which is able to persist metadata in accordance with the structure of a meta-schema, mapping the meta-schema to the metamodel, and translating specific metadata from the at least one external metadata source to the metadata repository for use in import, export or synchronization of metadata between the external metadata source and the metadata repository.

There is further provided in accordance with a preferred embodiment of the present invention a computer-readable storage medium storing program code for causing a computer to perform the steps of providing (i) a configurable metamodel for modeling metadata that describes enterprise IT assets, and (ii) business rules on the metamodel, and validating specific metadata against the metamodel business rules.

There is yet further provided in accordance with a preferred embodiment of the present invention a computer-readable storage medium storing program code for causing a computer to perform the steps of providing (i) a configurable metamodel for modeling metadata that describes enterprise IT assets, and (ii) business rules on the metamodel, and guiding the generation of specific metadata using the metamodel business rules.

There is moreover provided in accordance with a preferred embodiment of the present invention a computer-readable storage medium storing program code for causing a computer to perform the steps of providing (i) a configurable metamodel for modeling metadata that describes enterprise IT assets, and (ii) business rules on the metamodel, and validating responsibility assignments against the metamodel business rules.

There is additionally provided in accordance with a preferred embodiment of the present invention a metadata management system for performing impact analysis on an IT system comprising a configurable metamodel for modeling metadata that describes assets of an enterprise IT system, the metamodel including meta-classes and meta-properties, business rules on the metamodel for indicating that certain meta-properties have impact consequences, and an impact analyzer operating on the configurable metamodel for determining which assets of the enterprise IT system are impacted by one or more specified assets.

There is further provided in accordance with a preferred embodiment of the present invention A method for generating metadata comprising providing (i) a configurable metamodel for modeling metadata that describes assets of an enterprise IT system, the metamodel including meta-classes and meta-properties, and (ii) business rules on said metamodel for indicating that certain meta-properties have impact consequences, and determining which assets of the enterprise IT system are impacted by one or more specified assets.

There is yet further provided in accordance with a preferred embodiment of the present invention a computer-readable storage medium storing program code for causing a computer to perform the steps of providing (i) a configurable metamodel for modeling metadata that describes assets of an enterprise IT system, the metamodel including meta-classes and meta-properties, and (ii) business rules on said metamodel for indicating that certain meta-properties have impact consequences, and determining which assets of the enterprise IT system are impacted by one or more specified assets.

There is moreover provided in accordance with a preferred embodiment of the present invention a metadata management system for performing impact analysis on an IT system including a configurable metamodel for modeling metadata that describes assets of an enterprise IT system, the metamodel including meta-classes and meta-properties, a meta-descriptor for meta-properties to designate that a meta-property has an impact consequence, and an impact analyzer operating on said configurable metamodel for determining which assets of the enterprise IT system are impacted by one or more specified assets.

There is additionally provided in accordance with a preferred embodiment of the present invention a method for generating metadata including providing (i) a configurable metamodel for modeling metadata that describes assets of an enterprise IT system, the metamodel including meta-classes and meta-properties, and (ii) a meta-descriptor for meta-properties to designate that a meta-property has an impact consequence, and determining which assets of the enterprise IT system are impacted by one or more specified assets.

There is further provided in accordance with a preferred embodiment of the present invention a computer-readable storage medium storing program code for causing a computer to perform the steps of providing (i) a configurable metamodel for modeling metadata that describes assets of an enterprise IT system, the metamodel including meta-classes and meta-properties, and (ii) a meta-descriptor for meta-properties to designate that a meta-property has an impact consequence, and determining which assets of the enterprise IT system are impacted by one or more specified assets.

BRIEF DESCRIPTION OF THE DRAWINGS

The present invention will be more fully understood and appreciated from the following detailed description, taken in conjunction with the drawings in which.

DETAILED DESCRIPTION

The present invention is preferably embodied within at least one server computer used to store configurable information about enterprise data assets in the form of a metamodel and metadata conforming to the metamodel; and within a plurality of client computers used to generate and edit metadata, and to query the metadata. The present invention enables an enterprise to understand the structure of all of its data assets and other IT assets, even when metadata information on the structures comes from many sources in different formats. The present invention uses rules to impose restrictions on allowed metadata values and hence on the types of structures which may appear in the IT environment.

Figure 1:
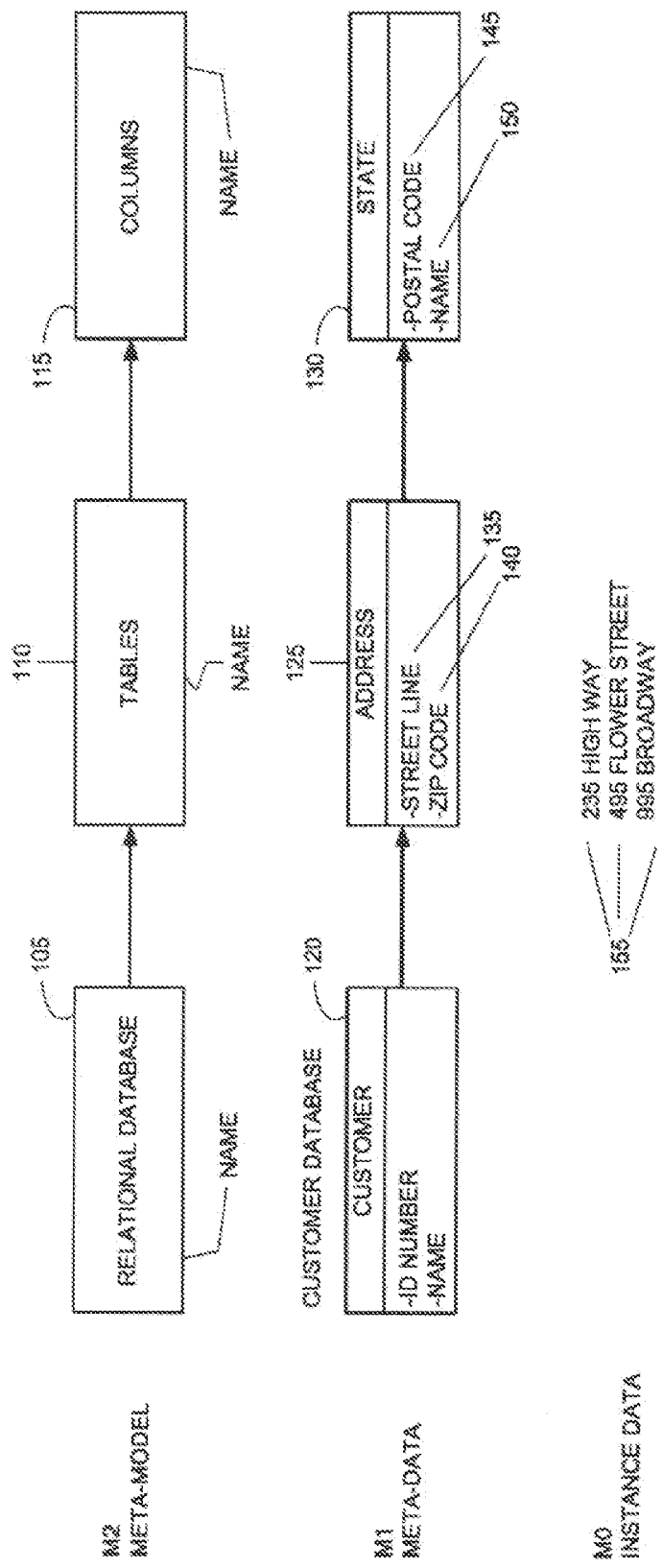
FIG. 1 is a simplified illustration of an Object Management Group hierarchy including instance data, metadata and a metamodel, in accordance with a preferred embodiment of the present invention.

Reference is now made to FIG. 1, which is a simplified illustration of an Object Management Group hierarchy including instance data, metadata and a metamodel, in accordance with a preferred embodiment of the present invention; A metamodel, referred to as an M2, is used to define the structural elements of a data schema. For example, the M2 illustrated in FIG. 1 describes the elements of a relational database schema. As shown, a relational database schema 105 includes elements 110 referred to as "tables," and in turn tables includes elements 115 referred to as "columns." A relational database 105, a table 110 and a column 115 each have a text identifier referred to as its "name."

Metadata for a data schema, referred to as an M1, is used to define a specific data schema conforming to the metamodel. As shown in FIG. 1, the M1 metadata specifies a relational database 120 named "Customer Database." The customer database has a table 125 named "Address" and a table 130 named "State." In turn the Address table has a column 135 named "Street Line" and a column 140 named "Zip Code;" and the State table has a column 145 named "Postal Code" and a column 150 named "Name."

Specific instance data 155 conforming to the Customer Database, referred to as M0, is illustrated at the bottom of the hierarchy of FIG. 1. It may be appreciated that, just as M0 corresponds to instance data for an M1, in the same manner M1 corresponds to instance data for an M2.

Metamodels and metadata may be specified using the Meta-Object Facility (MOF™) specification, developed by Object Management Group, Inc. (OMG®) of Needham, Mass.

Preferably, in accordance with a preferred embodiment of the present invention, metamodels are represented in terms of an ontology having classes and properties, such as ontologies based on the W3C Web Ontology Language (OWL) standard, as described in applicant's co-pending application U.S. Ser. No. 10/053,045, filed on Jan. 15, 2002, entitled "Method and System for Deriving a Transformation by Referring Schema to an Central Model," the contents of which are hereby incorporated by reference. In order to distinguish between M1 metadata and M2 metamodels, classes and properties within an M2 metamodel are referred to herein as meta-classes and meta-properties, respectively. In working with metamodels, it is often useful to consider meta-classes and meta-properties as being class types and property types, respectively. For example, specific relational database tables such as Address and State are of type Table; i.e., they are instance classes of a meta-class Table.

Preferably, metamodel M2 includes business rules, which relate various meta-properties. Examples of such business rules are described hereinbelow with reference to FIGS. 3 and 4.

Figure 2:
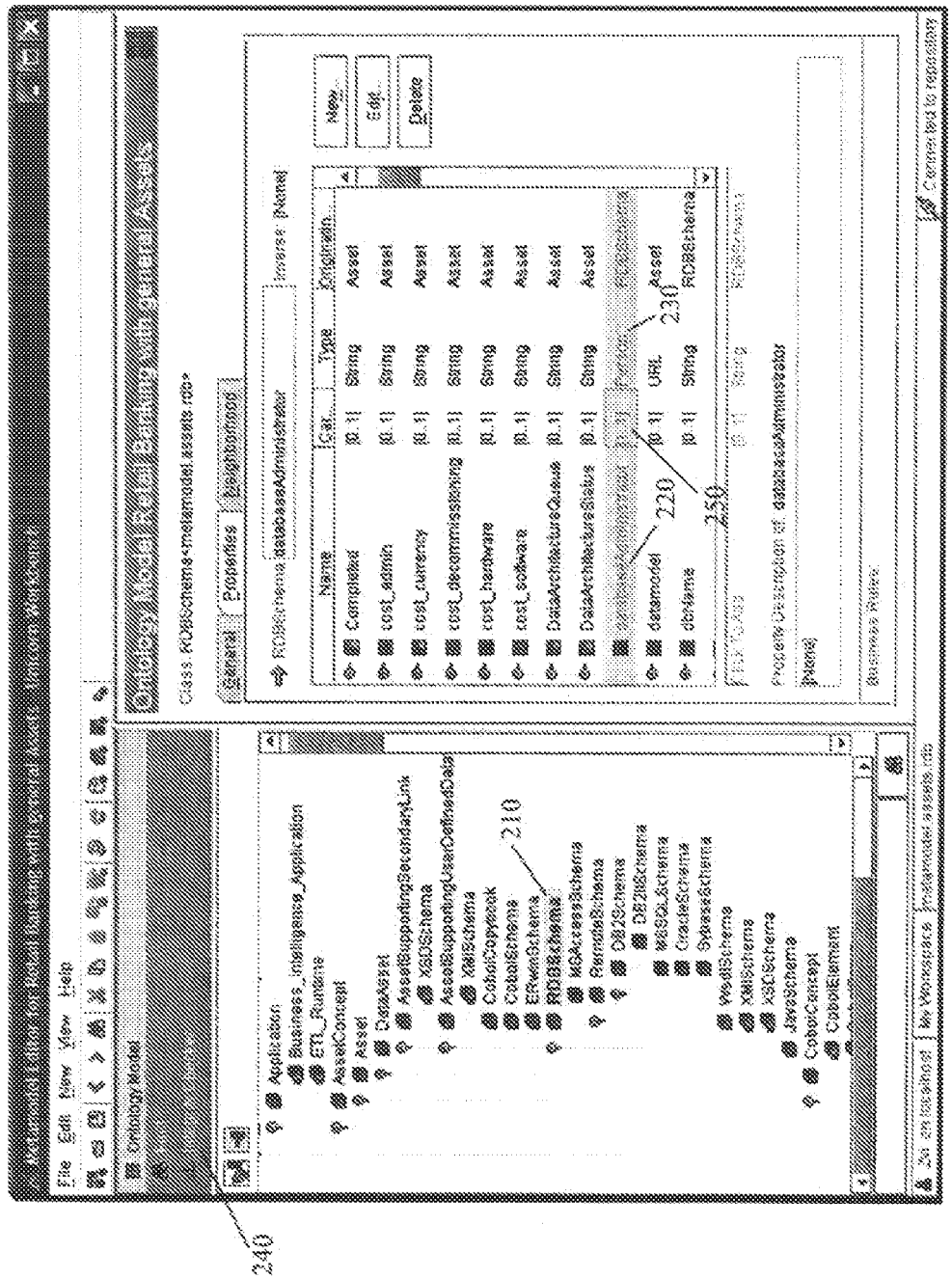
FIG. 2 illustrates a metamodel wherein a meta-class RDB-Schema is associated with a databaseAdministrator of type Person, in accordance with a preferred embodiment of the present invention.

Reference is now made to FIG. 2, which illustrates a metamodel wherein a meta-class RDBSchema 210 is associated with a databaseAdministrator 220 of type Person 230, in accordance with a preferred embodiment of the present invention.

Figure 3:
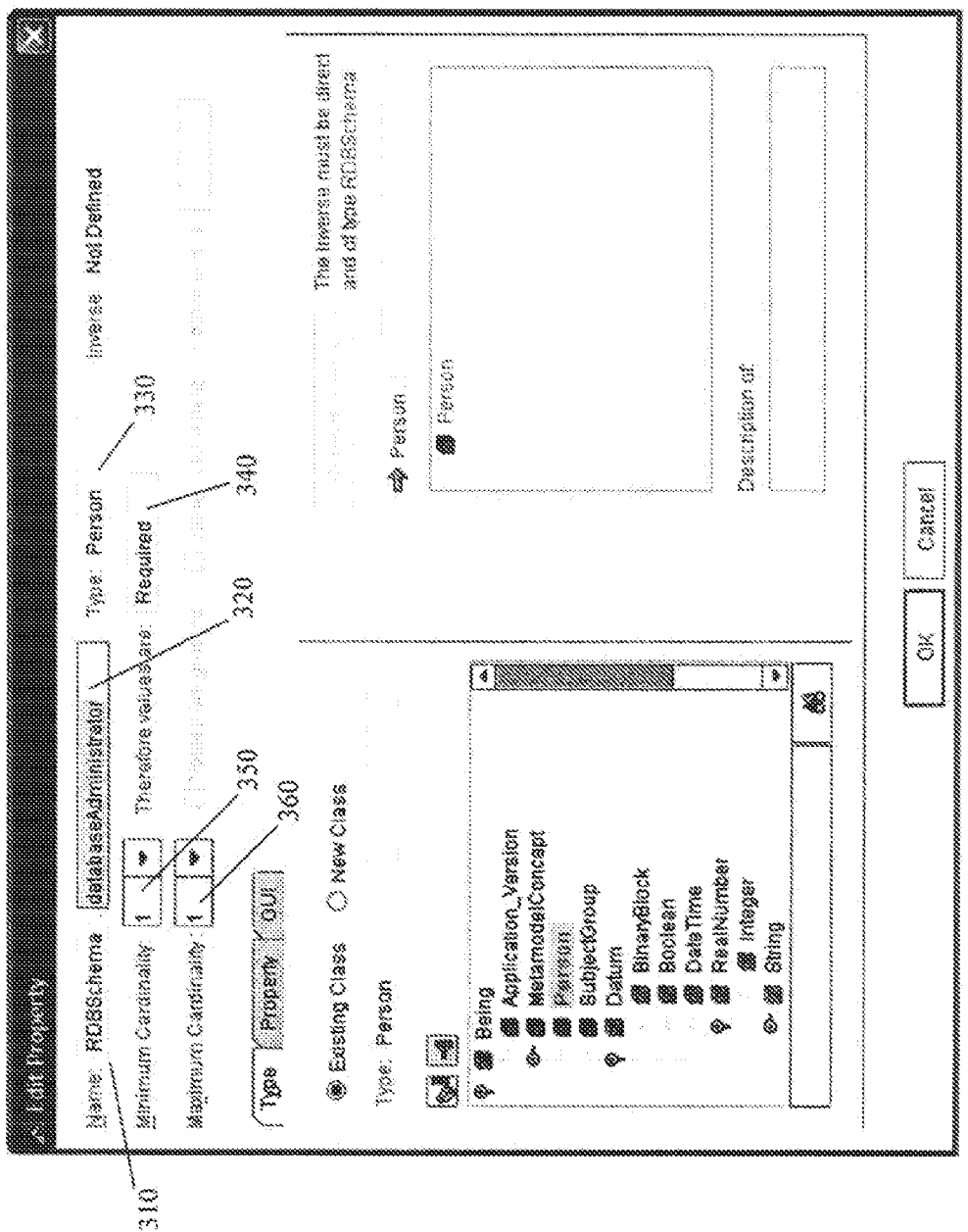
FIG. 3 illustrates a business rule requiring that every relational database must have a database Administrator, in accordance with a preferred embodiment of the present invention.

Reference is now made to FIG. 3, which illustrates a business rule requiring that every relational database 310 must have a meta-property databaseAdministrator 320 of type Person 330, in accordance with a preferred embodiment of the present invention. The business rule is set in FIG. 3 by marking the meta-property as Required 340. The cardinality of meta-property databaseAdministrator is [1 . . . 1], indicating that the minimum 350 and maximum 360 number of databaseAdministrators per RDBSchema is 1.

Referring back to FIG. 2, an integrity checker 240 preferably lists all violations of business rules. Thus, if a databaseAdministrator is not defined for an RDBSchema, then integrity checker 240 will flag this as a violation of the business rule shown in FIG. 3.

Figure 4:
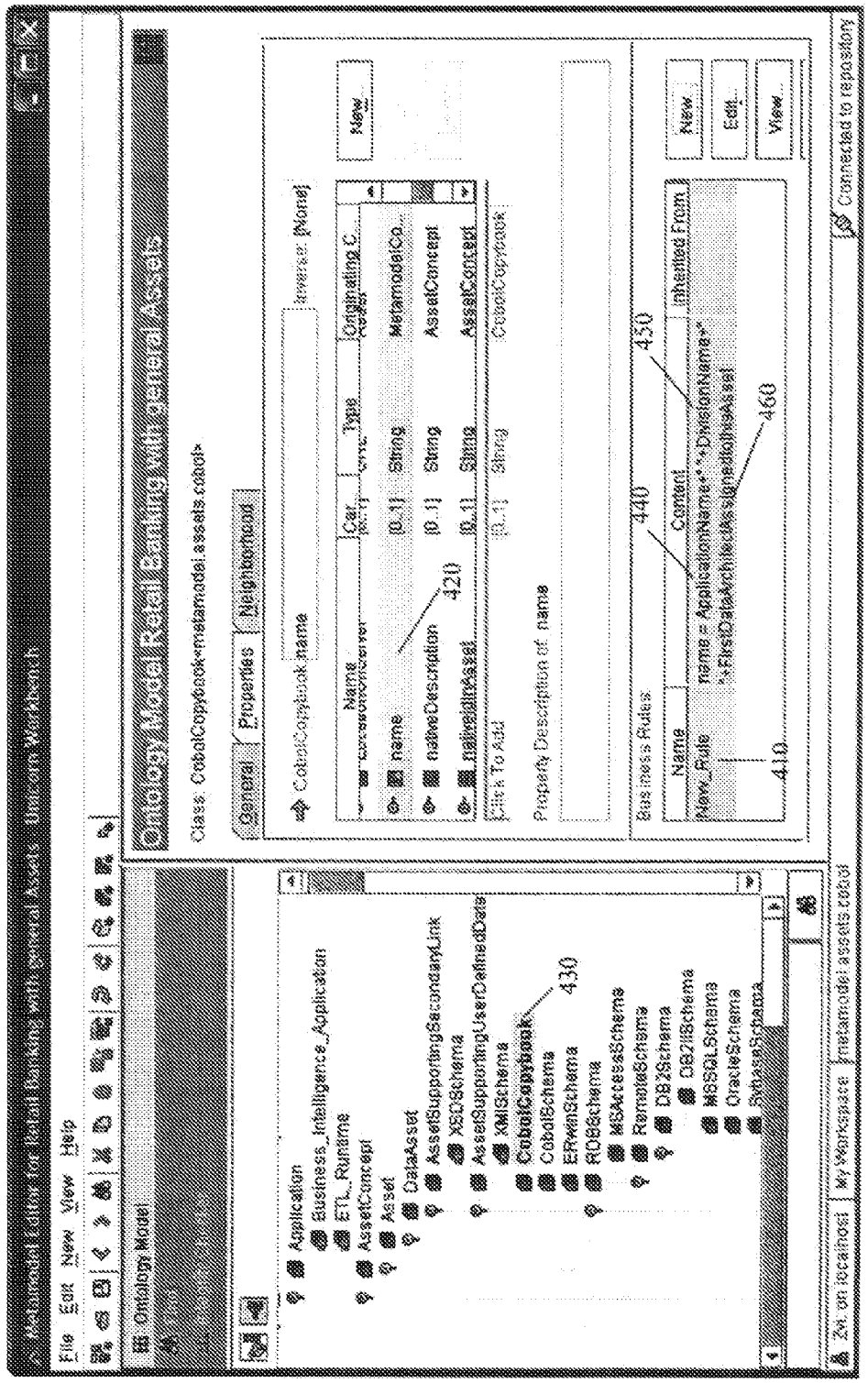
FIG. 4 illustrates a business rule wherein the name of a Cobol Copybook definition may be generated based on a naming standard from other meta-properties of a Cobol Copybook, such as ApplicationName, DivisionName, in accordance with a preferred embodiment of the present invention.

Reference is now made to FIG. 4, which illustrates a business rule wherein the name of a Cobol Copybook definition may be generated based on a naming standard from other meta-properties of a Cobol Copybook, such as Application Name and DivisionName, in accordance with a preferred embodiment of the present invention. Specifically, business rule 410 shown in FIG. 4 requires that the meta-property name 420 for the meta-class CobolCopybook 430 be the concatenation of the three strings ApplicationName 440, DivisionName 450 and FirstDataArchitectAssignedtothisAsset 460.

It may be appreciated by those skilled in the art that business rule 410 may be used to automatically generate the name for a CobolCopybook.

Examples of business rules that may be used with the present invention include inter alia:
 arithmetic conversion rules;
 type restrictions on inherited properties;
 specifying metadata values as being required;
 specifying valid ranges for metadata values;
 specifying metadata values as being unique;
 lookup tables;
 naming conventions; and
 assignments of stewardship responsibilities.

Business rules may also be used, in accordance with a preferred embodiment of the present invention, for type restrictions on indirect properties. Consider the following indirect sequence of meta-classes and meta-properties: C1.P1→C2.P2→C3. Suppose that the indirect meta-property C1.P1.P2 should be restricted to be of type S3, which is a sub-class of C3, but that C2.P2 is not to be restricted to S3. In general, there may not be an appropriate inheritance structure to impose such a restriction as a type restriction on an inherited property.

In accordance with a preferred embodiment of the present invention, a new meta-class, S2, corresponding to C1.P1, is defined as a sub-class of C2, and a business rule is used to restrict the type of S2.P2 to S3. Using this approach, none of the properties P1 or P2 in the property path are required to be inherited properties. Moreover, this approach applies to arbitrarily long property paths.

Figure 5:
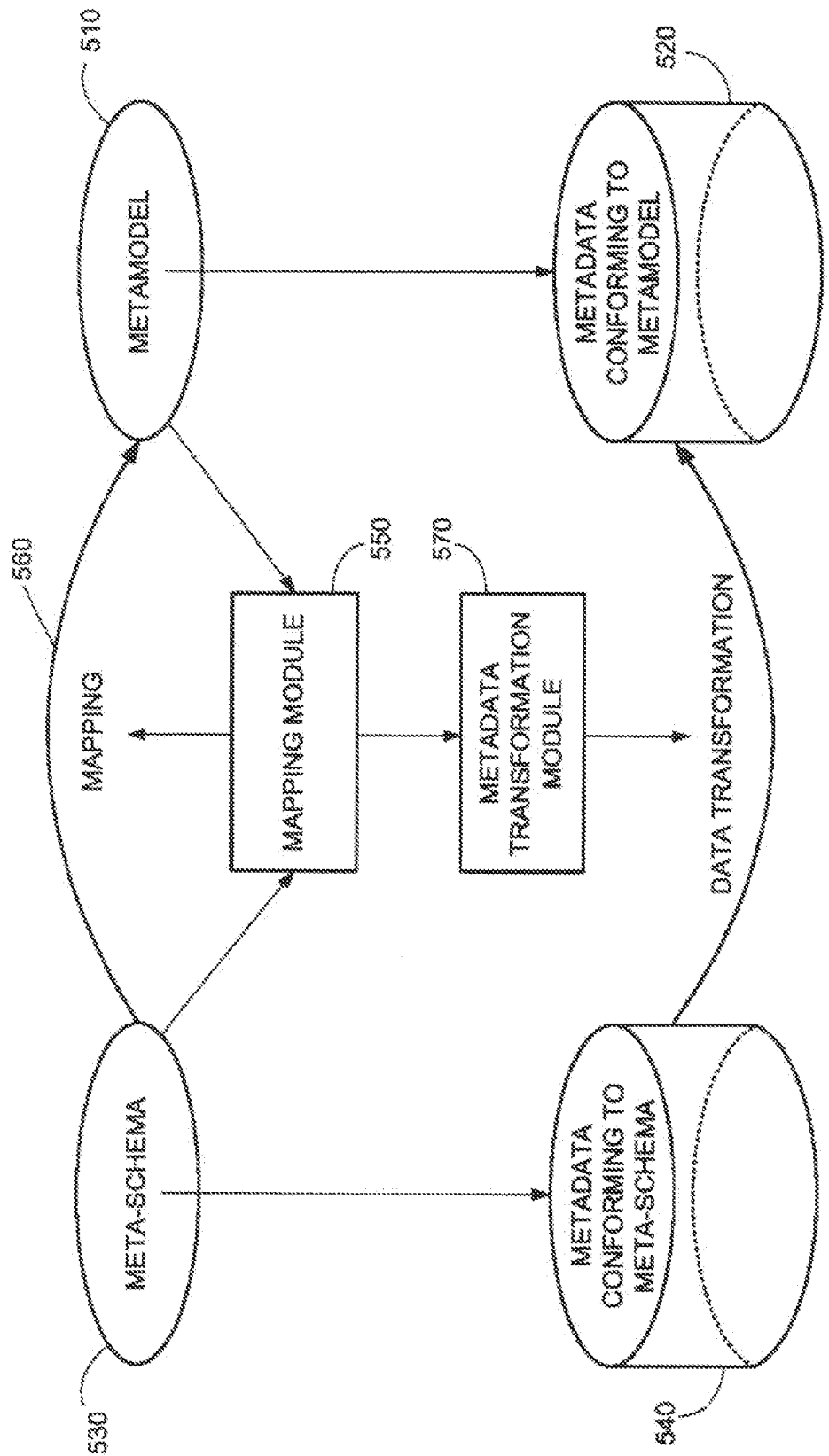
FIG. 5 is a simplified block diagram of a metadata management system for importing metadata, in accordance with a preferred embodiment of the present invention.
Figure 6:
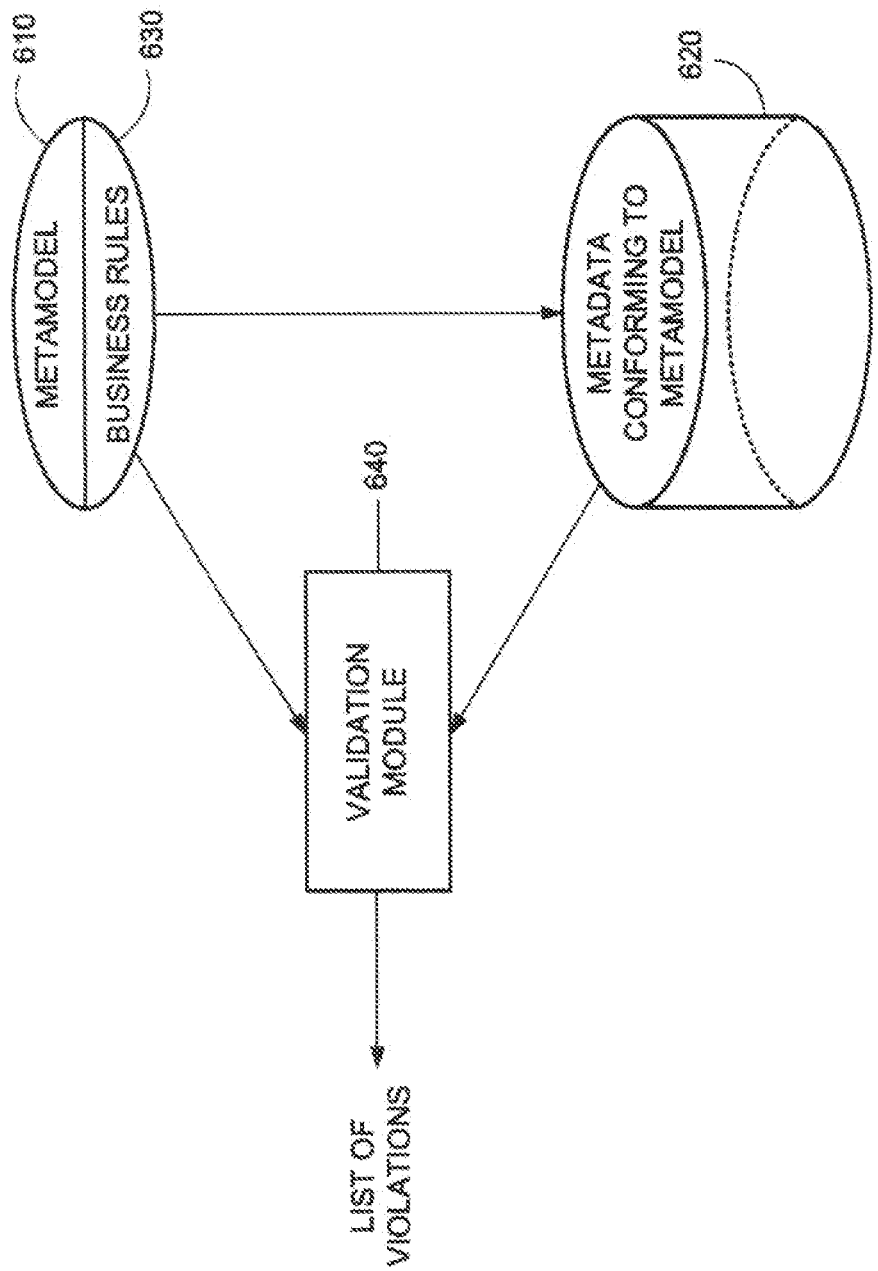
FIG. 6 is a simplified block diagram of a system for validating metadata, in accordance with a preferred embodiment of the present invention.
Figure 7:
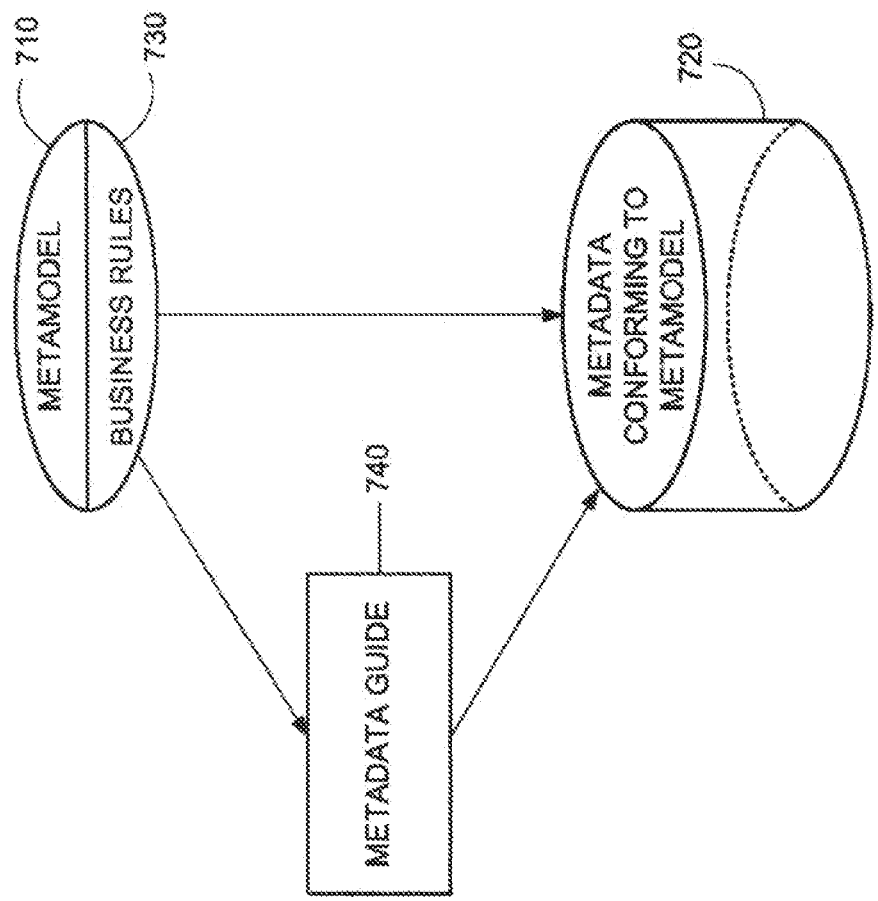
FIG. 7 is a simplified block diagram of a system for automatically guiding the generation of metadata so as to ensure that the metadata is compliant with business rules of a metamodel, in accordance with a preferred embodiment of the present invention.

It may be appreciated by those skilled in the art that the present invention has widespread application. FIGS. 5-7 illustrate three different applications of the present invention in the area of enterprise metadata management.

Reference is now made to FIG. 5, which is a simplified block diagram of a metadata management system for importing metadata, in accordance with a preferred embodiment of the present invention. FIG. 5 illustrates a metamodel of an enterprise, such as the metamodel illustrated in FIGS. 2 and 4, including meta-classes and sub-classes for business applications and data assets. The class DataAsset includes inter alia sub-classes CobolCopybook, ErwinSchema, RDBSchema, XMISchema and XSDSchema. FIG. 2 displays meta-properties for the RDBSchema meta-class, and FIG. 4 displays metadata for the CobolCopybook meta-class.

Shown in FIG. 5 are a configurable metamodel 510, and a repository 520 of metadata that conforms to metamodel 510. Also shown in FIG. 5 are an external meta-schema 530 and a repository 540 of metadata that conforms to meta-schema 530. Since the metadata in repository 540 conforms to a different meta-schema than the metadata in repository 520, the metadata in repository 540 cannot readily be imported into repository 520. For example, the metadata in repository 540 may be metadata for XML schemas, whereas the metadata in repository 520 may be metadata for relational database schemas.

The system illustrated in FIG. 5 imports the metadata from repository 540 into repository 520. A mapping module 550 is used to generate a mapping 560 between the meta-schema 530 and the metamodel 510. Generation of mappings between schemas is described in applicant's aforementioned co-pending patent application U.S. Ser. No. 10/053,045. For example, mapping 560 may associate

| XML Schema | | Metamodel |
|---|---|---|
| XML complexType | --> | class |
| XML element | --> | property |

When mapping 560 is generated, a metadata transformation module 570 uses mapping 560 to derive a data transformation for transforming metadata from repository 540 to metadata that conforms to metamodel 510. Upon transformation, the metadata in repository 540 can then be directly imported into repository 520. Derivation of transformations is also described in applicant's aforementioned co-pending patent application U.S. Ser. No. 10/053,045.

For example, if metadata from repositories 520 and 540 is represented by XML data, which may conform to the Metadata Interchange (XMI) standard, then the data transformation derived by transformation module 570 may be an XSLT script. XMI is a standard of the Object Management Group (OMG®) for interchanging metadata between modeling tools and metadata repositories, and XSLT is a language developed by the World-Wide Web Consortium (W3C®), for transforming XML documents into other XML documents.

It may be appreciated by those skilled in the art that M1 metadata can be considered as instance data for an M2 metamodel. As such the same mapping module 550 and the same transformation module 570 from FIG. 5, may also be used to map a first set of M1 metadata to a second set of M1 metadata, and to transform M0 instance data conforming to the first set of metadata to M0 instance data conforming to the second set of metadata. This allows the same tools and skills to be used for mapping metadata and transforming instance data, as is used for mapping metamodels/meta-schemas and transforming metadata.

Reference is now made to FIG. 6, which is a simplified block diagram of a system for validating metadata, in accordance with a preferred embodiment of the present invention. Shown in FIG. 6 are a configurable metamodel 610 and a repository 620 of metadata conforming to metamodel 610. Metamodel 610 includes one or more business rules 630, that relate meta-properties within metamodel 610, such as the business rules illustrated in FIGS. 3 and 4.

Shown in FIG. 6 is a validation module 640, which is preferably activated by a integrity checker control such as button 240 (FIG. 2). Preferably, validation module 640 verifies each of the business rules 630 against the metadata in repository 620, and produces a list of violations. It may be appreciated that violations of metadata rules may correspond to violations of IT policy by the actual systems that the metadata reflects.

It may be appreciated that the system of FIG. 6 applies to a variety of enterprise metadata. For example, metadata repository 620 may be metadata for an IT organization, and the business rules may define valid responsibility assignments. In such a case, validation module 640 is used to validate responsibility assignments.

Reference is now made to FIG. 7, which is a simplified block diagram of a system for automatically guiding the generation of metadata so as to ensure that the metadata is compliant with business rules of a metamodel, in accordance with a preferred embodiment of the present invention. Alternatively, the generation of metadata may be motivated by the desire to reduce the manual effort required in populating the metadata. Shown in FIG. 7 are a metamodel 710 and a repository 720 of metadata conforming to metamodel 720. Metamodel 710 includes one or more business rules 730.

Also shown in FIG. 7 is a metadata guide 740, which automatically guides a user who is generating metadata, so that the metadata complies with business rules 730. For example, with reference to FIG. 2, metadata guide 740 automatically ensures that each RDBSchema has a databaseAdministrator defined. Similarly, with reference to FIG. 4, metadata guide 740 automatically generates names of Cobol Copybooks, so that the name of a Copybook is a concatenation of an ApplicationName, a DivisionName and a FirstDataArchitectAssignedtothisAsset name.

Impact Analysis

The present invention has important application to impact analysis; namely, analyzing the impact of one or more IT assets on the rest of the IT infrastructure—i.e., determining, if one or more IT assets are shut down or modified, which other assets are impacted and how. Impact analysis is critical for routine system maintenance, system upgrade or modification, and for disaster recovery. Examples of impact analysis include inter alia:

determining which applications and systems will be impacted is a specific server shuts down;
determining who needs to be notified if a computer is replaced with a newer model;
determining which applications and systems will be impacted if a specific employee is promoted;
determining which data sources are fed by data from a specific database, either directly or indirectly; and
determine which data transformations are impacted if the type of a specific database column is changed, say from VARCHAR to INTEGER.

In a very general framework, in accordance with a preferred embodiment of the present invention, a binary relation such as "impacts" and its inverse binary relation "is impacted by" are imposed on meta-classes. These relations model the dependencies whereby one class may impact or may be impacted by another class, respectively. To generate these binary relations within a metamodel, appropriate meta-properties within the metamodel are characterized by "impacts" or "is impacted by", and the binary relations then correspond to the transitive closure of these characterizations. Thus, if asset A impacts asset B, and asset B impacts asset C, then asset A also impacts asset C.

Within this general framework, the characterization of meta-properties as "impacts" or "is impacted by" is accomplished through a business rule referred to as an "Inclusion BR" and a property referred to as "impacts". The Inclusion BR indicates that a first property P1 is included in a second property P2, where the domain of P1 is a sub-class of the domain of P2; namely, that whenever instance I is related to instance J via property P1, then instance I is also related to instance J via property P2. It may be appreciated by those skilled in the art that the Inclusion BR for P1 being included in P2 corresponds to P1 being a sub-property of P2.

To make the property "impacts" as broad as possible, it is preferably defined on a super-meta-class of the metamodel, such as a meta-class "Being" which is a super-meta-class of all meta-classes within the metamodel. Thus the Inclusion BR, indicating that a meta-property P from a domain meta-class C1 to a co-domain meta-class C2 is included in property "impacts", requires that whenever instance I1 of meta-class is related to instance I2 of meta-class C2 via meta-property P, then impacts I2.

For example, for a meta-class "Server", the Inclusion BR may specify that the two meta-properties "hasRunningApplications" (Server→Application) and "hasRunningDBs" (Server→Database) are impact meta-properties; i.e., included within the meta-property "impacts". Thereafter an impact analysis on a specific server will produce all applications that run on the server and all databases that are hosted by the server. Similarly, for a meta-class "Application", the Inclusion BR may specify that the two meta-properties "is FeedingInto" (Application→RDBTable) and "is CreatingXML" (Application→XMLDocument) are impact properties. Combining these by transitivity, a specific server may impact various relational database tables and various XML documents.

Figure 8:
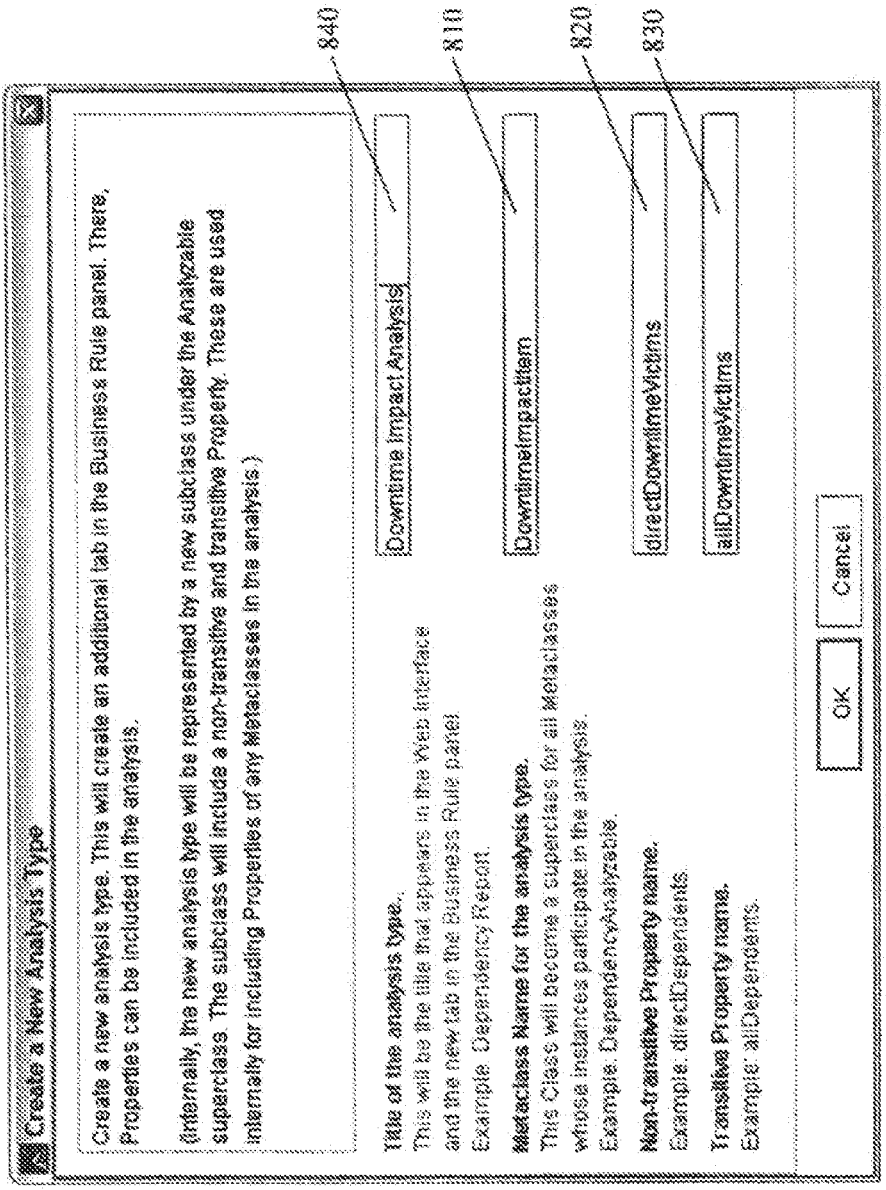
FIG. 8 is an illustration of a dialogue box for creating an impact analysis (IA) meta-class, in accordance with a preferred embodiment of the present invention.

More specifically, as there are various type of impacts in an enterprise, a variety of different impact analyses may be performed; for example, a "downtime" impact analysis, a "procurement" impact analysis, or a "personnel" impact analysis. The same meta-class may participate in multiple impact analyses. Reference is now made to FIG. 8, which is an illustration of a dialogue box for creating an impact analysis (IA) meta-class, in accordance with a preferred embodiment of the present invention. As shown in FIG. 8, a meta-class named "DowntimeImpactItem" 810 is created, together with meta-properties "directDowntimeVictims" 820 and "allDowntimeVictims" 830, the former property corresponding to direct dependencies and the latter property corresponding to both direct and indirect dependencies. Also shown in FIG. 8 is the name of an impact analysis, "Downtime Impact Analysis" 840, which is used to perform an impact analysis vis a vis downtime impacts.

The meta-class "DowntimeImpactItem" serves as a super-class for all meta-classes whose instances can participate in the analysis. Thus, for example, if ComputingDevice is a meta-class that should participate in downtime impact analysis, then it should be designated as a sub-class of DowntimeImpactItem and, as such, it inherits the properties directDowntimeVictims and allDowntimeVictims. Instances of sub-classes of meta-class ComputingDevice, such as instances of a class ServerComputer, of a class GatewayComputer and of a class ClientComputer, will then all participate in downtime impact analysis. Any meta-class that inherits from DowntimeImpactItem can be included within a downtime impact analysis. Similarly, if a meta-class inherits from multiple meta-classes, each super-class being a specific impact analysis type, then instances of the meta-class participate in each of the specific impact analyses.

It may thus be appreciated that an IA type of entity is preferably represented by a meta-class that has a property such as inter alia "impacts", "affects" or "hasConsequencesFor". The name of the meta-class preferably reflects the role of an instance class of its IA type, such as inter alia "DownTimeImpactItem" or "ProcurementImpactItem".

Figure 9:
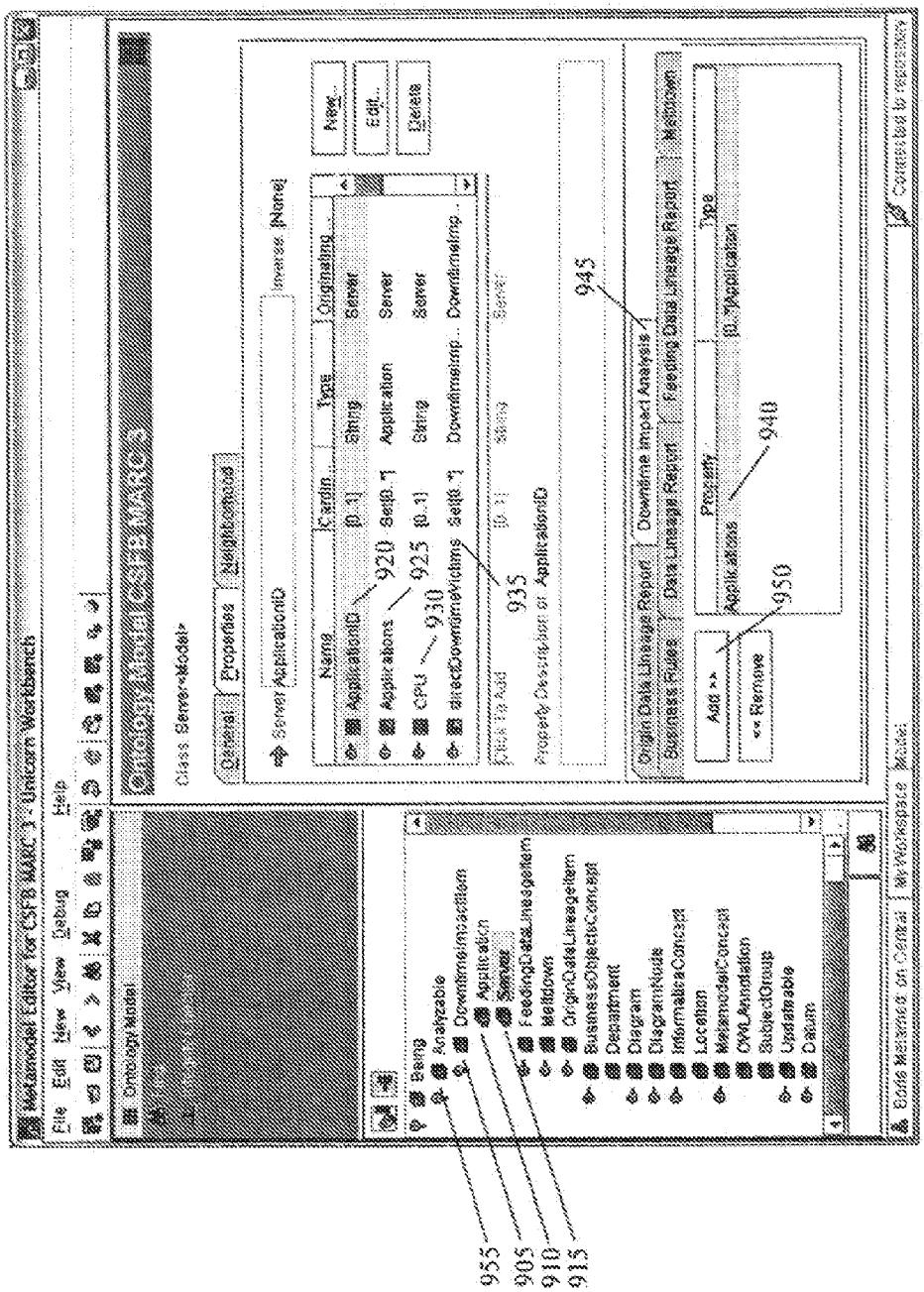
FIG. 9 is an illustration of a dialogue box that continues the workflow from FIG. 8, for designating properties as being germane to a particular impact analysis, in accordance with a preferred embodiment of the present invention.

Reference is now made to FIG. 9, which is an illustration of a dialogue box that continues the workflow from FIG. 8, for designating properties as being germane to a particular impact analysis, in accordance with a preferred embodiment of the present invention. Shown in the left panel of FIG. 9 is a meta-class "DowntimeImpactItem" 905, as defined in the dialogue box of FIG. 8, from which meta-classes "Application" 910 and "Server" 915 inherit, by virtue of being sub-classes thereof. Shown in the right panel of FIG. 9 are various properties of the meta-class Server, such as "ApplicationID" 920, "Applications" 925, "CPU" 930 and the inherited property directDowntimeVictims 935, as also defined in the dialogue box of FIG. 8. Also shown in FIG. 8 is a business rule that assigns the meta-property "Applications" 940 to Downtime Impact Analysis 945. For convenience, a user merely selects the Applications meta-property 925 from the list of Server meta-properties, and then clicks on the Add button 950. Such a business rule indicates that instance classes of Applications are impacted when corresponding instance classes of Server go down. As such, when a downtime impact analysis is performed, applications running on server computers will be included in the analysis. It may thus be appreciated by those skilled in the art that impact analyses are conveniently defined via business rules of a meta-model.

In accordance with a preferred embodiment of the present invention, in order to simplify the workflow of defining impact analyses and in order to avoid potential errors in the metamodel, when a user adds a meta-property, such as Applications, with meta-classes C1 and C2 as its domain and co-domain, respectively, to an impact analysis, then meta-classes C1 and C2 are automatically designated as sub-classes of the appropriate IA meta-class, such as DowntimeImpactItem. As such, a user does not have to set these sub-class designations manually. It is also noted in FIG. 9 that, for convenience of implementation and management, IA meta-classes are direct sub-classes of meta-class "Analyzable" 955.

Figure 10:
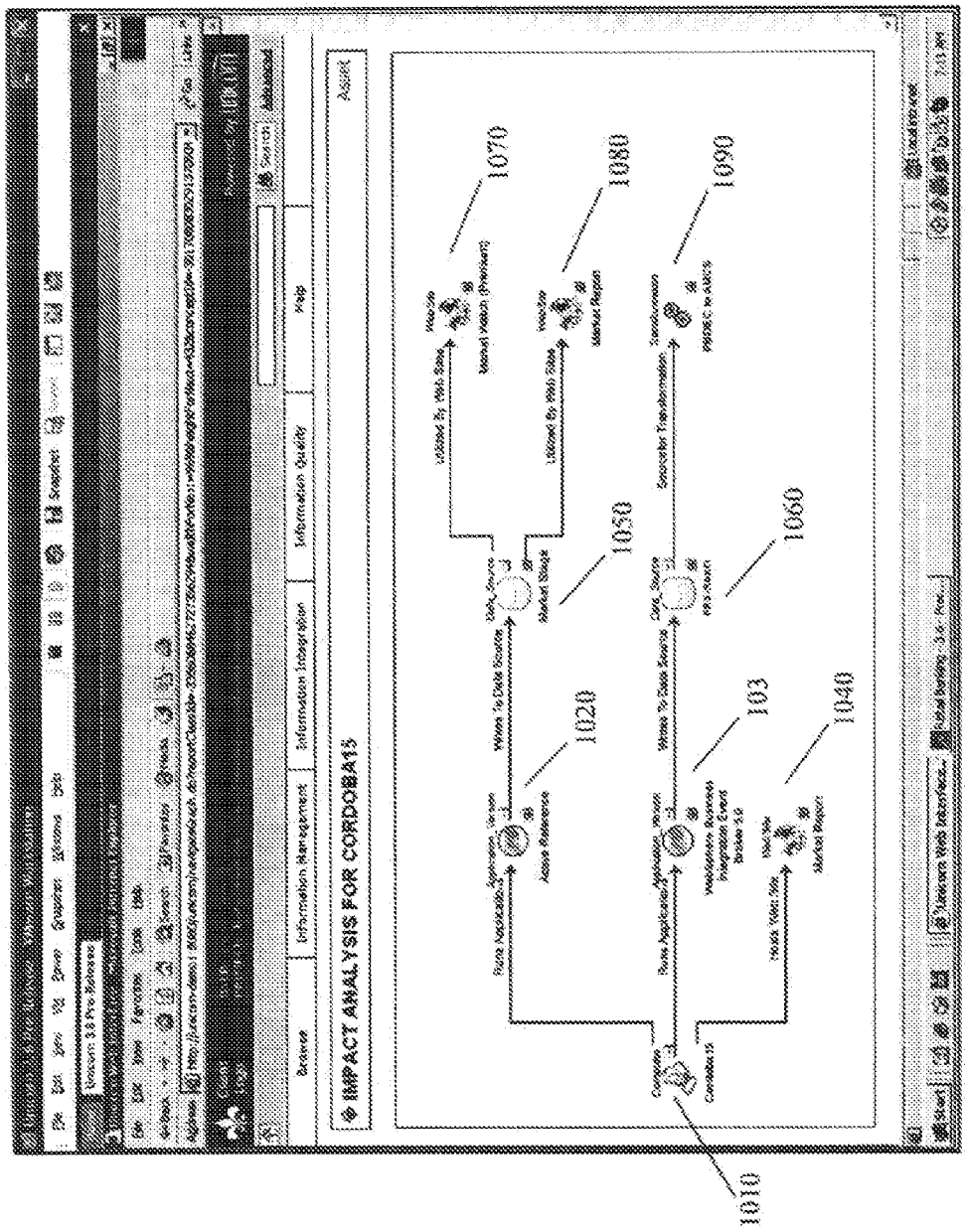
FIG. 10 is an illustration of stepwise graphical navigation of a meta-model, in accordance with a preferred embodiment of the present invention.

Reference is now made to FIG. 10, which is an illustration of stepwise graphical navigation of a meta-model, in accordance with a preferred embodiment of the present invention. The screen shown in FIG. 10 enables a user to explore each node in a metamodel in a controlled way. By clicking on a "plus" sign for a node A, a user instructs the navigator to display all nodes that node A has an impact relation therewith, together with arrows that are labeled in accordance with the underlying meta-properties.

Shown in FIG. 10 is a computer server 1010 which runs applications 1020 and 1030, and hosts a web site 1040. In turn, application 1020 writes to a data source 1050 and application 1030 writes to a data source 1060. Further in turn, data source 1050 is used by web sites 1070 and 1080, and data source 1060 is used in transformation 1090. All of the indicated properties are preferably included within an "impacts" property and, as such, server 1010 directly impacts the three IT assets 1020, 1030 and 1040, and indirectly impacts the five IT assets 1050, 1060, 1070, 1080 and 1090. It may thus be appreciated that using the present invention, an IT administrator is able to determine the impact of shutting down server 1010 or application 1020, for example.

Figure 11:
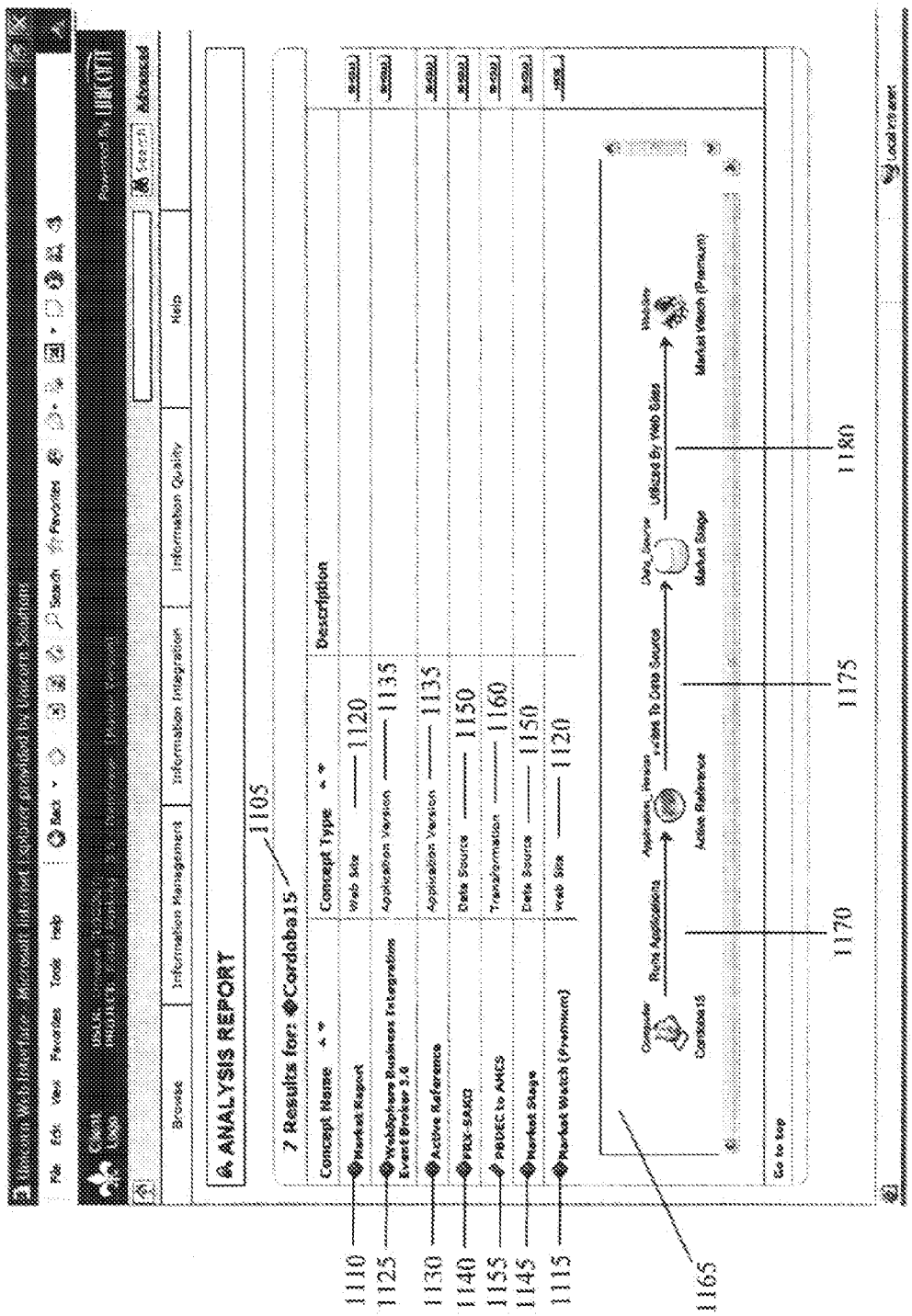
FIG. 11 is an illustration of a graphic display of the transitive closure of impacted notes, in accordance with a preferred embodiment of the present invention.

In contrast to the stepwise navigation illustrated in FIG. 10, reference is now made to FIG. 11, which is an illustration of a graphic display of the transitive closure of impacted nodes, in accordance with a preferred embodiment of the present invention. Shown in FIG. 11 is a list of classes impacted by a class "Cordoba15" 1105, which is an instance of a meta-class "Computer". The list includes a class "Market Report" 1110 and a class "Market Watch (Premium)" 1115, which are instances of a meta-class "Web Site" 1120, a class "WebSphere Business Integration Event Broker 5.0" 1125 and a class "Active Reference" 1130 which are instances of a meta-class "Application Version" 1135, a class "FRX-SAKO" 1140 and a class "Market Stage" 1145, which are instances of a meta-class "Data Source" 1150, and a class "PBDEC to AMCS" 1155, which is an instance of a meta-class "Transformation" 1160. The list includes classes that are directly and indirectly impacted by Cordoba15.

When a user clicks on a specific item in the list, the chain of impact dependencies is displayed below. For example, the graphic display in FIG. 11 shows the dependency chain 1165 from Cordoba15 to Market Watch (Premium). Each of the arrows 1170, 1175 and 1180 correspond to a direct impact dependency.

It may be appreciated by those skilled in the art that, alternatively, binary relations "impacts" and "is impacted by" may correspond to relations other than the transitive closure of "impacts" and "is impacted by" characterizations. For example, they may correspond to a transitive closure up to a specified number of levels, so that indirect impact is restricted to, say, three levels.

It may also be appreciated that property inclusion may alternatively be implemented using descriptors to tag certain meta-properties as being impact-related. However, implementation using an Inclusion BR allows more generality, including (i) allowing different types of impact or be distinguished, and (ii) allowing inference to take advantage of the "impacts" property.

Data Lineage

A somewhat similar application to impact analysis is data lineage, which is a technique for finding sources of property values. For example, a user may want to know "for a property "productName", which is part of an Entity "Product Parameters", which is part of a Data Asset "ProductSearchUI" where does its value come from?"

Figure 12:
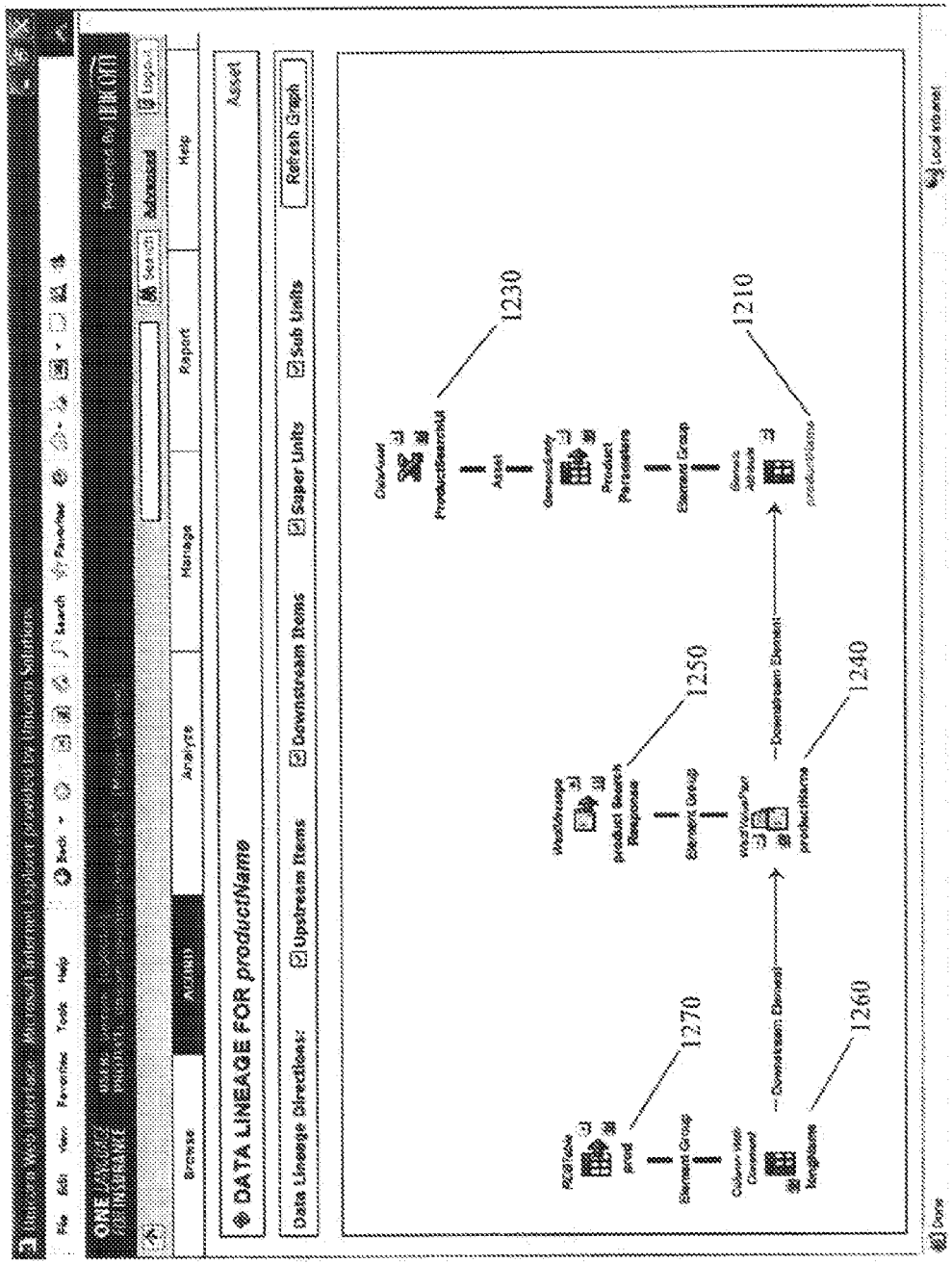
FIG. 12 is an illustration of a graphical user interface for viewing data lineage results arranged along a "data flow axis" and a "system composition axis", in accordance with a preferred embodiment of the present invention.

In accordance with a preferred embodiment of the present invention, data lineage is described as if it were a four-way impact analysis, using two axes. A first axis, the "data flow axis", indicates the flow of data using a property "Downstream Items" and a corresponding inverse property "Upstream Items". A second axis, the "system composition axis", indicates system components using a property "subUnits" and a corresponding inverse property "superUnits." Reference is now made to FIG. 12, which is an illustration of a graphical user interface for viewing data lineage results arranged along the two above axes, in accordance with a preferred embodiment of the present invention. The results illustrated in FIG. 12 are evoked when a user selects the productName property and invokes data lineage analysis. The horizontal arrows depict the data flow axis and the vertical arrows depict the system composition axis.

Specifically, as seen in FIG. 12 from the vertical dependencies, "productName" 1210 is an attribute of a GenericEntity "Product Parameters" 1230, and Product Parameters 1230 is an asset from a DataAsset "ProductSearchUI" 1230. Moreover, as seen from the horizontal dependencies, productName 1210 is assigned a value based on a corresponding property "productName" 1240 of class "WsdlValuePart". In turn, productName 1240 is part of a message "product Search Response" 1250. Moreover, productName 1240 is assigned a value from a Column "longName" 1260 of a relational database table "prod" 1270.

Figure 13:
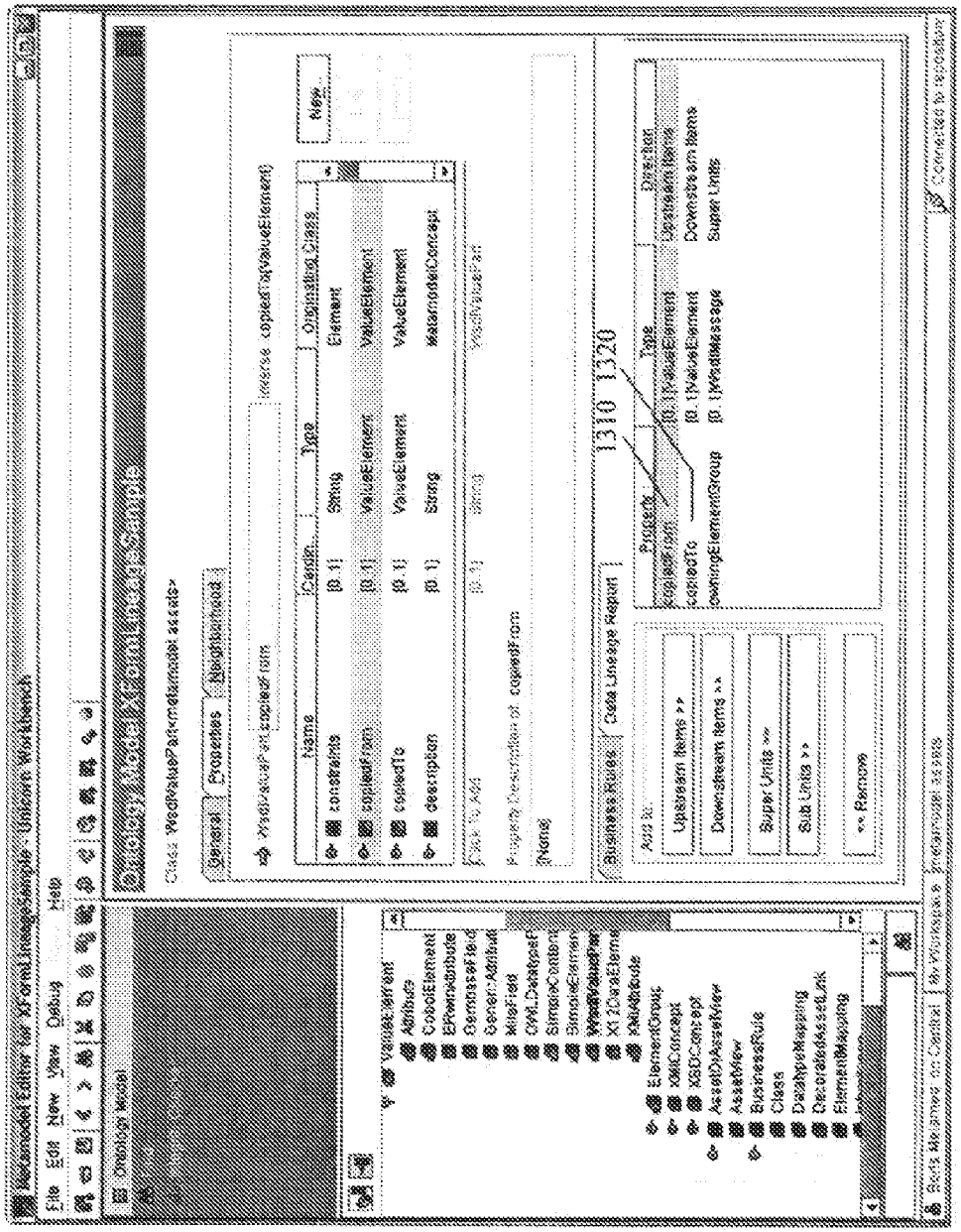
FIG. 13 is an illustration of a graphical user interface for marking meta-properties as being Downstream Items, Upstream Items, subunits or superUnits, in accordance with a preferred embodiment of the present invention.

Reference is now made to FIG. 13, which is an illustration of a graphical user interface for marking meta-properties as being Downstream Items, Upstream Items, subunits or superUnits, in accordance with a preferred embodiment of the present invention. As shown in FIG. 13, a meta-property "copiedFrom" 1310, is designated as being included in Upstream Items 1320, and its inverse meta-property, "copiedTo" 1330 is included in Downstream Items 1340. Specifically, "copiedFrom" and "copiedTo" are meta-properties from meta-class WsdlValuePart to meta-class ValueElement.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A metadata management system for performing impact analysis on an IT system comprising:
a storage having computer readable program code embodied therewith;
a bus connecting the storage to at least one processor; and
at least one processor, wherein the at least one processor executes the computer readable program code to implement:
a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations;
business rules on said metamodel for indicating that certain meta-properties have impact consequences, wherein the business rules are selected from the group consisting of arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and
an impact analyzer operating on said configurable metamodel for determining which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

2. A method for generating metadata comprising:
providing (i) a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations, and (ii) business rules on said metamodel for indicating that certain meta-properties have impact consequences, wherein the business rules are selected from the group consisting of arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and
determining which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

3. The method of claim 2 whereby assets of the enterprise IT system include server computers.

4. The method of claim 2 whereby assets of the enterprise IT system include web sites.

5. The method of claim 2 whereby assets of the enterprise IT system include data sources.

6. The method of claim 2 whereby assets of the enterprise IT system include data transformations.

7. The method of claim 2 whereby assets of the enterprise IT system include software applications.

8. The method of claim 2 whereby the business rules dictate whether impact consequences are transitive and, if so, to what degree.

9. A computer program product for performing impact analysis, the computer program product comprising:
a non-transitory computer readable storage medium having computer readable program code embodied therewith, the computer readable program code comprising:
computer readable program code configured to provide (i) a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations, and computer readable program code configured to provide (ii) business rules on said metamodel for indicating that certain meta-properties have impact consequences, wherein the business rules are selected from the group consisting of arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and computer readable program code configured to determine which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

10. A metadata management system for performing impact analysis on an IT system comprising:

a storage having computer readable program code embodied therewith;

a bus connecting the storage to at least one processor; and at least one processor, wherein the at least one processor executes the computer readable program code to implement:

a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations;

a meta-descriptor for meta-properties to designate that a metaproperty has an impact consequence, wherein the impact consequence of the meta-property is designated by a business rule, the business rule being selected from the group consisting of arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and an impact analyzer operating on said configurable metamodel for determining which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

11. A method for generating metadata comprising:

providing (i) a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations, and (ii) a meta-descriptor for metaproperties to designate that a metaproperty has an impact consequence, wherein the impact consequence of the meta-property is designated by a business rule, the business rule being selected from the group consisting arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and determining which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

12. A computer program product for performing impact analysis, the computer program product comprising:

a non-transitory computer readable storage medium having computer readable program code embodied therewith, the computer readable program code comprising:

computer readable program code configured to provide (i) a configurable metamodel for modeling metadata that describes assets of an enterprise IT system, the metamodel including meta-classes and meta-properties, wherein the meta-classes and the meta-properties are modeled by imposing binary relations and inverse binary relations on the meta-classes and the meta-properties corresponding to a transitive closure of the binary relations and the inverse binary relations, and computer readable program code configured to provide (ii) a meta-descriptor for metaproperties to designate that a metaproperty has an impact consequence, wherein the impact consequence of the meta-property is designated by a business rule, the business rule being selected from the group consisting arithmetic conversion rules, type restrictions on inherited properties, type restrictions on indirect properties, specifying metadata values as being required, specifying valid ranges for metadata values, specifying metadata values as being unique, lookup tables, naming conventions, and assignments of stewardship responsibilities, and combinations thereof; and computer readable program code configured to determine which assets of the enterprise IT system are impacted by one or more specified assets, wherein the impact determination of selected from the group consisting of determining which applications and systems will be impacted if a specific server shuts down, determining who needs to be notified if a computer is replaced with a newer model, determining which applications and systems will be impacted if a specific employee is promoted, determining which data sources are fed by data from a specific database, either directly or indirectly, determining which data transformations are impacted if the data type of a specific database column is changed, and combinations thereof.

* * * * *